(12) United States Patent
Van Dun et al.

(10) Patent No.: US 7,345,113 B2
(45) Date of Patent: Mar. 18, 2008

(54) BIMODAL POLYETHYLENE COMPOSITION AND ARTICLES MADE THEREFROM

(75) Inventors: Jozef J. Van Dun, Zandhoven (BE); Patrick J. C. Schouterden, Wachtebeke (BE); Kalyan Sehanobish, Rochester, MI (US); Peter F. van den Berghen, Graauw (NL); Noorallah Jivraj, Lake Jackson, TX (US); Johan Vanvoorden, Diepenbeek (BE); Ruddy A. J. Nicasy, Westerlo (BE); Ravi S. Dixit, Lake Jackson, TX (US); Frederik E. Gemoets, Wommelgem (BE)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 11/480,091

(22) Filed: Jun. 30, 2006

(65) Prior Publication Data

US 2007/0021567 A1    Jan. 25, 2007

Related U.S. Application Data

(63) Continuation of application No. 10/817,030, filed on Apr. 2, 2004, now Pat. No. 7,129,296, which is a continuation of application No. 10/222,273, filed on Aug. 16, 2002, now Pat. No. 6,787,608.

(60) Provisional application No. 60/313,357, filed on Aug. 17, 2001, provisional application No. 60/313,176, filed on Aug. 17, 2001.

(51) Int. Cl.
*C08L 23/00* (2006.01)
*C08L 23/04* (2006.01)
*C08F 8/00* (2006.01)

(52) U.S. Cl. ..................... 525/191; 525/240
(58) Field of Classification Search ............. 525/191, 525/240
See application file for complete search history.

(56) References Cited

U.S. PATENT DOCUMENTS

| | | |
|---|---|---|
| 3,456,044 A | 7/1969 | Pahlke |
| 3,485,706 A | 12/1969 | Evans |
| 3,645,992 A | 2/1972 | Elston |
| 4,322,027 A | 3/1982 | Reba |
| 4,340,563 A | 7/1982 | Appel et al. |
| 4,352,849 A | 10/1982 | Mueller |
| 4,413,110 A | 11/1983 | Kavesh et al. |
| 4,461,873 A | 7/1984 | Bailey et al. |
| 4,506,096 A | 3/1985 | Weitz et al. |
| 4,542,199 A | 9/1985 | Kaminsky et al. |
| 4,597,920 A | 7/1986 | Golike |
| 4,663,220 A | 5/1987 | Wisneski et al. |
| 4,668,566 A | 5/1987 | Braun |
| 4,798,081 A | 1/1989 | Hazlitt et al. |
| 4,820,557 A | 4/1989 | Warren |
| 4,837,084 A | 6/1989 | Warren |
| 4,865,902 A | 9/1989 | Golike et al. |
| 4,927,708 A | 5/1990 | Herran et al. |
| 4,937,299 A | 6/1990 | Ewen et al. |
| 4,952,451 A | 8/1990 | Mueller |
| 4,963,419 A | 10/1990 | Lustig et al. |
| 5,008,204 A | 4/1991 | Stehling |
| 5,059,481 A | 10/1991 | Lustig et al. |
| 5,089,321 A | 2/1992 | Chum et al. |
| 5,206,075 A | 4/1993 | Hodgson, Jr. |
| 5,218,071 A | 6/1993 | Tsutsui et al. |
| 5,241,031 A | 8/1993 | Mehta |
| 5,252,017 A | 10/1993 | Hodel |
| 5,272,236 A | 12/1993 | Lai et al. |
| 5,278,272 A | 1/1994 | Lai et al. |
| 5,290,498 A | 3/1994 | Shiraki et al. |
| 5,292,845 A | 3/1994 | Kawasaki et al. |
| 5,319,029 A | 6/1994 | Martin et al. |
| 5,382,630 A | 1/1995 | Stehling et al. |
| 5,408,004 A | 4/1995 | Lai et al. |
| 5,417,561 A | 5/1995 | Shiraki et al. |
| 5,536,796 A | 7/1996 | Jejelowo et al. |
| 5,578,682 A | 11/1996 | White |
| 5,582,923 A | 12/1996 | Kale et al. |
| 5,631,069 A | 5/1997 | Wooster et al. |
| 5,665,800 A | 9/1997 | Lai et al. |
| 5,677,383 A | 10/1997 | Chum et al. |

(Continued)

FOREIGN PATENT DOCUMENTS

DE    3127133 A1    1/1983

(Continued)

OTHER PUBLICATIONS

Borealis Unveils Borstar-Its New Propriety Polyethylene Technology, Press Release, Oct. 10, 1995.
Mapleston, P.,Infrared Process is Fast and Repeatable, Mod. Plast. Int., V. 22, No. 10, Oct. 1992. p. 34/8 (Abstract).
New Generation Polyolefins, Nissan-Lyondell-Maruzen High Density Technology, Aug./Sep. 1997, vol. 3-Iss. 1, p. 17.

(Continued)

*Primary Examiner*—Nathan M. Nutter

(57) ABSTRACT

The invention relates to a polyethylene composition with a bimodal molecular weight distribution, methods for making the same, and articles made therefrom, such as high topload blow moldings and transmission and distribution pipes. The composition comprises a low-molecular-weight (LMW) ethylene homopolymer component and a homogeneous, high-molecular-weight (HMW) ethylene interpolymer component, wherein the LMW component is characterized as having a molecular weight distribution, $MWD^L$, of less than about 8. In some embodiments, the HMW component is characterized by a reverse comonomer distribution.

13 Claims, 6 Drawing Sheets

U.S. PATENT DOCUMENTS

| | | |
|---|---|---|
| 5,683,767 A | 11/1997 | Shiraki et al. |
| 5,723,507 A | 3/1998 | Markovich et al. |
| 5,773,155 A | 6/1998 | Kale et al. |
| 5,834,393 A | 11/1998 | Jacobsen et al. |
| 5,844,045 A | 12/1998 | Kolthammer et al. |
| 5,847,053 A | 12/1998 | Chum et al. |
| 5,908,679 A | 6/1999 | Berthold et al. |
| 6,043,180 A | 3/2000 | Jacobsen et al. |
| 6,054,544 A | 4/2000 | Finlayson et al. |
| 6,111,023 A | 8/2000 | Chum et al. |
| 6,114,483 A | 9/2000 | Coughlin et al. |
| 6,191,227 B1 | 2/2001 | Matsuoka et al. |
| 6,194,520 B1 | 2/2001 | Cheruvu et al. |
| 6,204,349 B1 | 3/2001 | Shinohara et al. |
| 6,218,472 B1 | 4/2001 | Debras et al. |
| 6,221,982 B1 | 4/2001 | Debras et al. |
| 6,252,017 B1 | 6/2001 | Debras et al. |
| 6,316,549 B1 | 11/2001 | Chum et al. |
| 6,346,575 B1 | 2/2002 | Debras et al. |
| 6,441,096 B1 | 8/2002 | Backman et al. |
| 6,462,135 B1 | 10/2002 | Rohde et al. |
| 6,462,161 B1 | 10/2002 | Cady et al. |
| 6,469,103 B1 | 10/2002 | Jain et al. |
| 6,506,866 B2 | 1/2003 | Jacobsen et al. |
| 6,538,080 B1 | 3/2003 | Swindoll et al. |
| 6,545,093 B1 | 4/2003 | de Lange et al. |
| 6,545,094 B2 | 4/2003 | Oswald et al. |
| 6,723,793 B2 | 4/2004 | Oswald et al. |
| 6,770,341 B1 | 8/2004 | Bohm et al. |
| 6,787,608 B2 | 9/2004 | VanDun et al. |
| 7,037,977 B2 * | 5/2006 | Miserque et al. ............ 525/191 |
| 2002/0045711 A1 | 4/2002 | Backman et al. |
| 2003/0055176 A1 | 3/2003 | Jacobsen et al. |
| 2003/0120013 A1 | 6/2003 | Jacobsen |
| 2004/0266966 A1 | 12/2004 | Schramm et al. |

FOREIGN PATENT DOCUMENTS

| | | |
|---|---|---|
| EP | 0 022 376 | 1/1981 |
| EP | 0 707 040 B1 | 9/1995 |
| EP | 0 733 674 B1 | 3/1996 |
| EP | 0 776 909 A1 | 6/1997 |
| EP | 1 146 078 A1 | 10/2001 |
| EP | 1 146 079 A1 | 10/2001 |
| EP | 1 201 711 A1 | 5/2002 |
| EP | 1 201 713 A1 | 5/2002 |
| EP | 0 783 022 B1 | 9/2004 |
| WO | WO-90/03414 A1 | 4/1990 |
| WO | WO-92/12182 | 7/1992 |
| WO | WO-93/03093 | 2/1993 |
| WO | WO-94/17112 | 8/1994 |
| WO | WO-94/25523 | 11/1994 |
| WO | WO-95/05419 | 2/1995 |
| WO | WO-95/30713 | 11/1995 |
| WO | WO-96/16092 | 5/1996 |
| WO | WO-96/28480 | 9/1996 |
| WO | WO-96/35750 | 11/1996 |
| WO | WO-97/19807 | 6/1997 |
| WO | WO-97/29152 | 8/1997 |
| WO | WO-97/33116 | 9/1997 |
| WO | WO-97/33935 | 9/1997 |
| WO | WO-97/43323 | 11/1997 |
| WO | WO-98/27119 | 6/1998 |
| WO | WO-99/14271 | 3/1999 |
| WO | WO-00/01765 | 1/2000 |
| WO | WO-00/22040 A1 | 4/2000 |
| WO | WO-00/58376 | 10/2000 |
| WO | WO-01/02480 A1 | 1/2001 |
| WO | WO-01/05852 A1 | 1/2001 |
| WO | WO-01/25328 A1 | 4/2001 |
| WO | WO-01/79347 A2 | 10/2001 |
| WO | WO-02/34829 | 5/2002 |
| WO | WO-02/36678 | 5/2002 |
| WO | WO-03/016362 A1 | 2/2003 |

OTHER PUBLICATIONS

Elias, Hans-Georg, Macromolecules 1 Structure and Properties, 1977, pp. 384-385, 414-415, Plenum Press, New York and London.

Plati et al., The Determination of the Fracture Parameters for Polymers in Impact, Polymer Engineering and Science, Jun. 1975, p. 470-477, V. 15-Iss.6, The Society of Plastics Engineers, Inc.

Plati, E. and Williams, J.G., Polymer Engineering and Science, Jun. 1975, vol. 15, No. 6, pp. 470-477.

Finathene® Xsene Bimodal Polyethylene Pipe Resin with Hexane Comonomer, Aug. 1998.

International Search Report for PCT/US2002/26161 (WO 03/016393), Jan. 22, 2003.

Yernaux J., Polymer Developments for Pipe Systems, Polyethylene: The 1990s and Beyond, Conference Proceedings London, May 19-20, 1992, Paper 16, 42C11 PRI;BP Chemicals Ltd.; Shell Chemicals Ltd.; European Chemical News.

Berthold et al., Advanced Polymerization Process for Tailor-Made Pipe Resins, Plastics Pipe IX, Edinburgh, Sep. 1995, pp. 433-441.

Bohm et al., The Industrial Synthesis of Bimodal Polyethylene Grades with Improved Properties, Stud. Surf. Sci. Catal., 1994, pp. 351-363, V.89.

Bohm et al., The Microreactor Model-Guideline for PE-HD Process and Product Developement, Ziegler Catalysts, 1995, 387-400.

* cited by examiner

BIMODAL POLYETHYLENE COMPOSITION AND ARTICLES MADE THEREFROM

CROSS-REFERENCE TO RELATED APPLICATIONS

This application is a continuation of U.S. application Ser. No. 10/817,030, filed Apr. 2, 2004, now allowed, now U.S. Pat. No. 7,129,296 which is a continuation of U.S. application Ser. No. 10/222,273, filed on Aug. 16, 2002, and now U.S. Pat. No. 6,787,608, which claims priority to U.S. Provisional Patent Application No. 60/313,357, filed Aug. 17, 2001, and is related to U.S. Provisional Patent Application Ser. No. 60/313,176, filed Aug. 17, 2001, the disclosures of each are incorporated herein by reference.

FIELD OF THE INVENTION

This invention relates to a high density polyethylene composition with a bimodal molecular weight distribution and articles made therefrom, especially high topload blow moldings and high temperature or high pressure, long duration pipes.

BACKGROUND OF THE INVENTION

Polyethylene pipes are light in weight, easy to handle, and are non-corrosive. In addition, their rigidity is relatively high that they can be laid under the ground, and their flexibility is also relatively high that they can follow a movement of ground. Due to these advantageous characteristics, the amount of polyethylene pipes used is rapidly increasing in recent years.

In addition to the above desirable characteristics, polyethylene pipes should have (1) impact resistance sufficient to endure impacts given at the time when and after they are set; and (2) excellent long-term durability under gas or water pressure (specifically, environmental stress cracking resistance and internal pressure creep resistance).

With respect to the long-term durability, conventional pipes may meet the ISO standard, i.e. 50-year durability at normal temperatures under an internal pressure, expressed in terms of circumferential stress, of approximately 8 MPa. However, the conventional polyethylene pipes are still insufficient in the long-term durability for use under more severe conditions, such as main pipes for gases or running water which have a large diameter and undergo high internal pressure. For this reason, they are presently used only for branch pipes and the like, having a small diameter.

The long-term durability of a polyethylene pipe is considered to be determined by the environmental stress cracking resistance, that is the resistance to cracking which is caused when an internal pressure applied to the pipe acts as a tensile stress in the circumferential direction on the pipe over a long period of time. Therefore, in order to improve the long-term durability of polyethylene pipes, it is necessary to improve the environmental (tensile) stress cracking resistance.

For plastic pipe applications, circumferential (hoop) stress performance as set forth in ISO 9080 and ISO 1167 is an important requirement. These procedures describe the long-term creep rupture behavior of plastic materials by an extrapolation methodology wherein the hydrostatic strength of pipe materials over 50 years at 20° C. are predicted. Typically, for long term predictive performance testing, candidate pipe materials are placed at various stresses and the lifetime at a given temperature is determined. For extrapolations to 50 years at 20° C., testing is also performed at higher temperatures. The measured lifetime curves at each temperature typically consists of either a high stress, lower lifetime ductile failure mode or a lower stress, longer lifetime brittle failure mode. The ductile failure mode is referred to as Stage I failure and conversely the brittle failure mode is referred to as Stage II failure.

First and second generation polyethylene pipes for water and gas distribution have minimum required strength (MRS) ratings for respective hoop stresses of 6.3 and 8 MPa and are known as PE63 and PE80, respectively. Third generation polyethylene pipes, which are known as PE100 pipes, conform to a MRS rating of 10. The MRS rating is based on the above ISO procedures wherein a MRS rating of 10 specifies that pipes made from the polyethylene materials must withstand 10 MPa at 20° C. for 50 years.

Another important pipe or durable material performance requirement is resistance to rapid crack propagation (RCP). The RCP of a pipe material is typically measured by testing extruded pipe in accordance with ISO 13477 (the so-called 'S4' test). But the S4 test is not susceptible to small scale evaluation and as such various small scale tests have been introduced in the plastic pipe industry. Small scale testing includes the inverted Charpy test and the Plane High-Speed Double Torsion test, as well as ranking tests such as a critical strain energy release rate test or $G_c$ measurement on compression molded materials. Also, the lower the ductile to brittle transition temperature, Tdb, of a material, the better is its RCP resistance.

In order to improve the environmental stress cracking resistance of a polyethylene composition, it is known to increase the molecular weight or to decrease the density of the polyethylene. However, when the molecular weight is increased, the fluidity of the polyethylene is lowered, so that the molding properties such as pipe-extrusion properties and injection moldability are impaired. When the density is decreased, the rigidity of the polyethylene is unfavorably lowered.

Although numerous pipe compositions have been known and used, there continues to exist a need for improved durable materials, especially for transmission and distribution pipe service for gases and water. Preferably, the materials should exhibit improved durability and/or higher temperature service lives. In particular, there is still a need for high density polyethylene durable materials with better resistance to slow crack propagation and/or rapid crack propagation.

SUMMARY OF THE INVENTION

We have discovered a bimodal high density polyethylene composition that exhibits improved durability. The new composition comprises at least a low-molecular-weight (LMW) ethylene homopolymer component having a molecular weight distribution, $MWD^L$, of less than about 8 and a high-molecular-weight (HMW) ethylene interpolymer component. Some compositions are characterized as having a bimodal molecular weight distribution and a ductile-brittle transition temperature, $T_{db}$, of less than −20° C. Preferably, the overall $M_w/M_n$ (indicative of the molecular weight distribution or MWD) of the novel composition is relatively narrow, and the $M_w/M_n$ of the LMW component is relatively narrow, or the MWD for both the LMW component and the HMW component is also relatively narrow, or the MWD of the each component is relatively narrow and completely distinct from one another. In some embodiments, the HMW component is characterized by a "reverse comonomer distribution."

DESCRIPTION OF EMBODIMENTS OF THE INVENTION

Figure 1A:
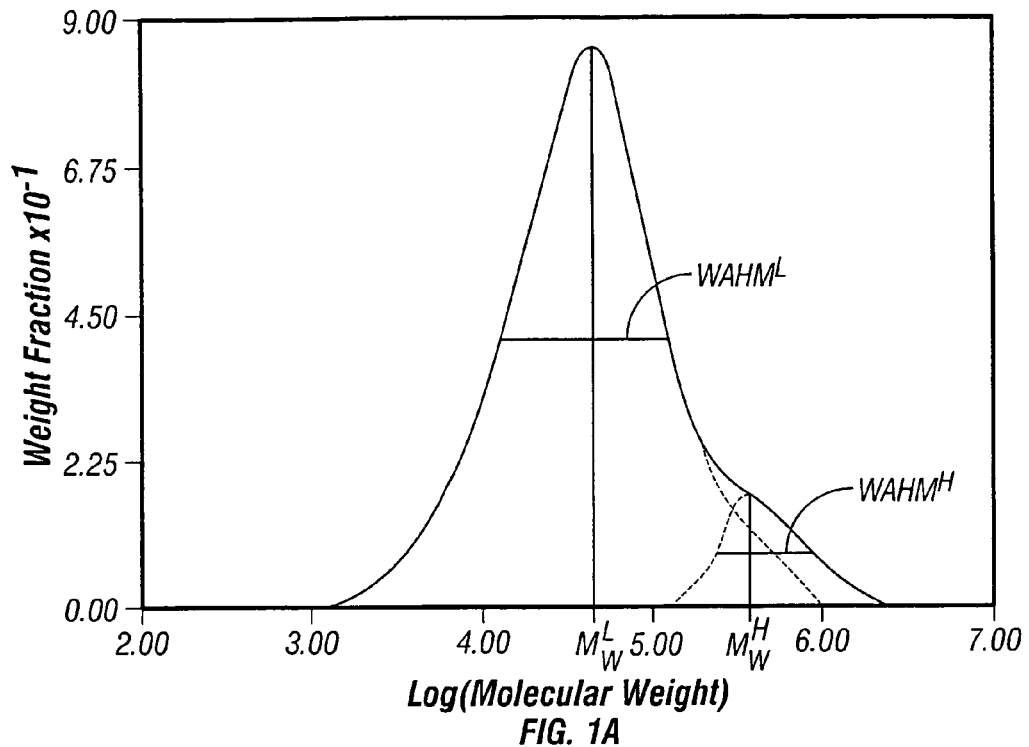
FIGS. 1A-1C are plots of molecular weight distribution for bimdoal polymers in accordance with embodiments of the invention.
Figure 1B:
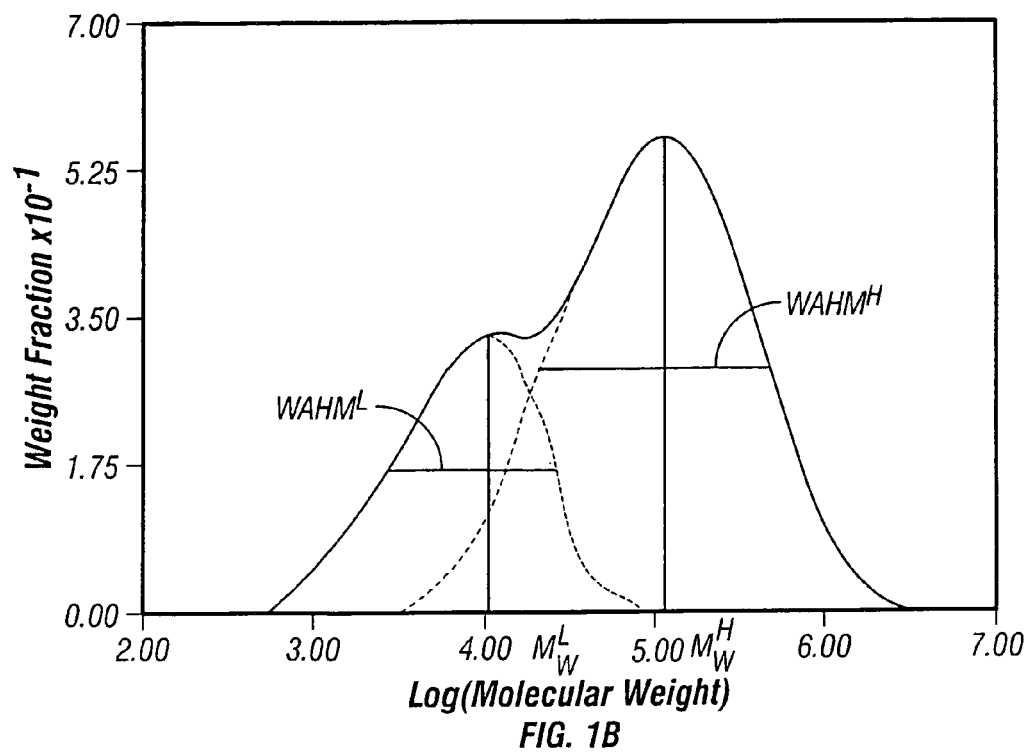
Figure 1C:
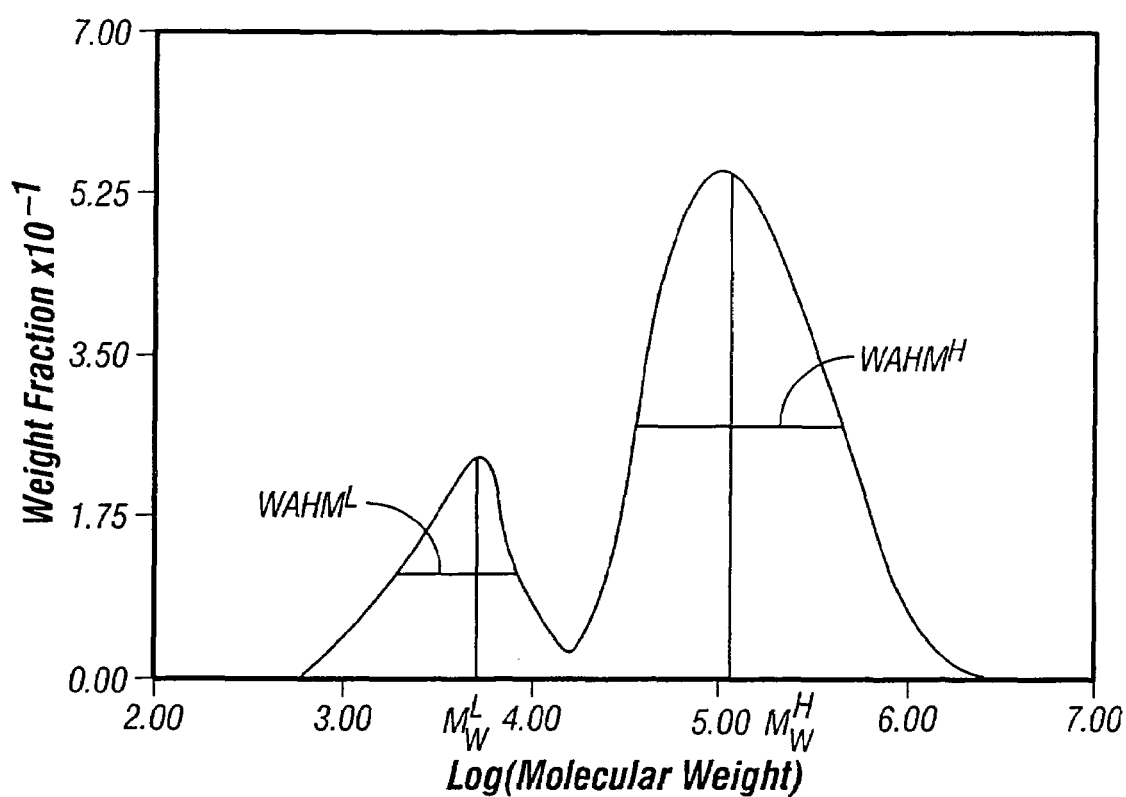

Embodiments of the invention provide a new polyethylene composition which can be used for making water or oil pipes and other products. The new composition comprises a low-molecular-weight (LMW) ethylene homopolymer component and a high-molecular-weight (HMW) ethylene interpolymer component. The new composition is characterized by a relatively narrow bimodal molecular weight distribution. The bimodality of the molecular weight distribution of the new composition is due to the difference in the MWD of the LMW component and the HMW component. Preferably, the MWD of each of the LMW and HMW components individually is unimodal, but is different and distinct from each other, such that, when mixed, the resulting composition has an overall bimodal molecular weight distribution. The LMW ethylene homopolymer component has a molecular weight distribution, $MWD^L$, of less than about 8. In some embodiments, the new composition is characterized as having a ductile-brittle transition temperature, $T_{db}$, of less than −20° C. In some embodiments, the HMW component is characterized by a substantially uniform comonomer distribution or a reverse comonomer distribution.

In the following description, all numbers disclosed herein are approximate values, regardless whether the word "about" or "approximate" is used in connection therewith. They may vary by 1%, 2%, 5%, and sometimes, 10 to 20%. Whenever a numerical range with a lower limit, RL and an upper limit, RU, is disclosed, any number falling within the range is specifically disclosed. In particular, the following numbers within the range are specifically disclosed: R=RL+ k*(RU−RL), wherein k is a variable ranging from 1% to 100% with a 1% increment, i.e., k is 1%, 2%, 3%, 4%, 5%, . . . , 50%, 51%, 52%, . . . , 95%, 96%, 97%, 98%, 99%, or 100%. Moreover, any numerical range defined by two R numbers as defined in the above is also specifically disclosed.

The term "substantially uniform comonomer distribution" is used herein to mean that comonomer content of the polymer fractions across the molecular weight range of the HMW component vary by less than 10 weight percent, preferably 8 weight percent, 5 weight percent, or 2 weight percent.

The term "homogeneous polymer" is used herein refers to polymerization products of relatively narrow molecular weight distribution and exhibiting a comonomer content of chains having the substantially the same molecular weight does not vary substantially from chain to chain, in other words the polymers exhibit a relatively even sequencing of comonomers within a chain at a given molecular weight.

The term "reverse comonomer distribution" is used herein to mean across the molecular weight range of the HMW component, comonomer contents for the various polymer fractions are not substantially uniform and the higher molecular weight fractions thereof have proportionally higher comonomer contents. Both a substantially uniform and a reverse comonomer distribution can be determined using fractionation techniques such as gel permeation chromatography-differential viscometry (GPC-DV), temperature rising elution fraction-differential viscometry (TREF-DV) or cross-fractionation techniques.

The term "bimodal" as used herein means that the MWD in a GPC curve exhibits two component polymers wherein one component polymer may even exist as a hump, shoulder or tail relative to the MWD of the other component polymer. A bimodal MWD can be deconvoluted into two components: LMW component and HMW component. After deconvolution, the peak width at half maxima (WAHM) and the average molecular weight (Mw) of each component can be obtained. Then the degree of separation ("DOS") between the two components can be calculated by the following equation:

$$DOS = \frac{M_w^H - M_w^L}{WAHM^H + WAHM^L}$$

wherein $M_w^H$ and $M_w^L$ are the respective weight average molecular weight of the HMW component and the LMW component; and $WAHM^H$ and $WAHM^L$ are the respective peak width at the half maxima of the deconvoluted molecular weight distribution curve for the HMW component and the LMW component. The DOS for the new composition is about 0.01 or higher. In some embodiments, DOS is higher than about 0.05, 0.1, 0.5, or 0.8. Preferably, DOS for the bimodal components is at least about 1 or higher. For example, DOS is at least about 1.2, 1.5, 1.7, 2.0, 2.5, 3.0, 3.5, 4.0, 4.5, or 5.0. In some embodiments, DOS is between about 5.0 to abut 100, between about 100 to 500, or between about 500 to 1,000. It should be noted that DOS can be any number in the above range. In other embodiments, DOS exceeds 1,000. Of course, in some embodiments, a "bimodal molecular weight distribution" may be deconvoluted with the freedom to fit more than two peaks. In some embodiments, the term "bimodal" does not include multimodal polymers, for example LDPE.

The term "unimodal" as used herein in reference to the overall MWD of comparative examples or in reference to the MWD of a component polymer of the inventive composition means the MWD in a GPC curve does not substantially exhibit multiple component polymers (i.e., no humps, shoulders or tails exist or are substantially discernible in the GPC curve). In other words, the DOS is zero or substantially close to zero.

The term "distinct" as used herein in reference to the molecular weight distribution of the LMW component and the HWM component means there is no substantial overlapping of the two corresponding molecular weight distributions in the resulting GPC curve. That is, each molecular weight distribution is sufficiently narrow and their average molecular weights are sufficiently different that the MWD of both components substantially exhibits a baseline on its high molecular weight side as well as on its low molecular weight side. In other words, the DOS is at least 1, preferably at least 2, 4, 5, 7, 9, or 10.

The term "interpolymer" is used herein to indicate, for example, a copolymer or a terpolymer. That is, at least one other comonomer is polymerized with ethylene to make an interpolymer.

The molecular weight distribution, Mw/Mn, of the composition is preferably less than 20, more preferably less than or equal to 19, most preferably less than or equal to 18, especially less than or equal to 17.5 and most especially in the range of from about 10 to about 17.5. In some embodiments, the MWD of the overall composition is less than 10, such as about 5, about 7, or about 9. Alternatively, the composition is preferably characterized as having an I21.6/I5 ratio of less than or equal to 22.5, more preferably less than or equal to 22, most preferably less than or equal to 21 and especially less than or equal to 20.

The relatively narrow molecular weight distribution, bimodal polyethylene composition is also characterized as having an overall density of greater than or equal to 0.94 g/cm3, preferably in the range of from about 0.94 to about 0.97 g/cm3, more preferably from about 0.948 to about 0.968 g/cm3, and an I5 melt index of less than or equal to 0.5 g/10 min., preferably in the range of from about 0.01 to about 0.5 g/10 minutes, more preferably from about 0.05 to about 0.45 g/10 minutes.

Alternatively, the novel composition can be characterized as having Mv1/Mv2 ratio of less than or equal to 0.8, preferably less than or equal to 0.6, more preferably less than or equal to 0.4, where Mv1 is the viscosity average molecular weight of the LMW high density component and Mv2 is the viscosity average molecular weight of the HMW interpolymer component, as determined using ATREF-DV analysis as described in detail in WO 99/14271, the disclosure of which is incorporated herein by reference. WO 99/14271 also describes a suitable deconvolution technique for multicomponent polymer blend compositions.

In some embodiments, the novel composition is characterized by a low ductile to brittle transition temperature, Tdb. Tdb may be measured by the S4 test and is sometimes referred to as the critical temperature for rapid crack propagation measurements. Tdb may also determined from critical strain energy release rate, GC, measurements in the Charpy mode. Some novel compositions described herein have a Tdb of less than about −20° C. Preferably, Tdb is about −30° C. or less, or about −40° C. or less. More preferably, Tdb is about −45° C. or less. In some embodiments, Tdb is about −50° C. or about −60° C. or less.

Some novel compositions are also characterized by exceptional resistance to slow crack growth as measured by the PENT test. Typically, compositions described herein have PENT lifetimes of about 110,000 minutes or more at 2.4 MPa and 80° C. Preferably, compositions have PENT lifetimes of about 150,000 to about 200,000 minutes or more. Most preferably, compositions have a PENT lifetime of about 250,000 to about 500,000 minutes.

Generally, the novel composition may comprise any amount of the LMW component or the HMW component, i.e., either component can be present from about 0.5 weight percent to about 99.5 percent. In some embodiments, the novel composition comprises from about 35 to about 65 weight percent, preferably from about 45 to about 55 weight percent of a low molecular weight (LMW) high density ethylene homopolymer component. The LMW component has an I2 melt index of less than or equal to 2000 g/10 minutes, preferably it is characterized as having an I2 melt index of from about 30 to about 2000 g/10 minutes, more preferably 40 to 1000 g/10 min., most preferably from about 50 to about 150 g/10 minutes. The Mw of the LMW component is preferably in the range from about 10,000 to about 40,000 g/mole, more preferably in the range of from about 25,000 to about 31,000 g/mole. The Mw/Mn of the LMW component is preferably less than 8, more preferably less than 5, most preferably about 3 or less. In other embodiments the Mw/Mn of the LMW component is about 2 or less. In some embodiments, the molecular weight distribution, Mw/Mn, of the LMW component is in the range of from about 1.5 to about 4.8. In certain embodiments, the Mw/Mn of the LMW component is most preferably in the range of from about 3.2 to about 4.5. The density of the LMW component is preferably greater than 0.960 g/cm3, more preferably greater than or equal to 0.965 g/cm3 and most preferably greater than or equal to 0.970 g/cm3.

The novel composition comprises from about 65 to about 35 weight percent, more preferably from about 55 to about 45 weight percent of a high molecular weight (HMW) ethylene interpolymer component. The HMW interpolymer component has an I2 melt index of less than or equal to 0.1 g/10 minutes, preferably it is characterized as having an I2 melt index of from about 0.001 to about 0.1 g/10 minutes, more preferably from about 0.005 to about 0.05 g/10 minutes, most preferably from about 0.0085 to about 0.016. The HMW component is also characterized by its I21.6 melt index ranging from about 0.1 to about 1.0 g/10 min. In some embodiments, I21.6 preferably ranges from about 0.1 to about 0.6 g/10 min., preferably from about 0.1 to about 0.5 g/10 min., more preferably from about 0.3 to about 0.4 g/10 min. In other embodiments, I21.6 ranges from greater than 0.6 to about 1.0 g/10 min., preferably from about 0.65 to about 0.95 g/10 min., more preferably from about 0.7 to about 0.9 g/10 min.

The Mw of the HMW component is preferably in the range from about 100,000 to about 600,000 g/mole, more preferably in the range of from about 300,000 to about 500,000 g/mole, and most preferably in the range of from about 375,000 to about 450,000 g/mole. The molecular weight distribution of the HMW component, MWDH, may be broad, but is typically less than about 8. In some embodiments, MWDH is less than about 5. Some preferred embodiments have a HMW component with a MWDH of about 3 or less, more preferably about 2 or less.

Preferably, the HMW component has a density ranging from about 0.905 to about 0.955 g/cm3. In some embodiments a lower limit of the preferred density range is about 0.910 or about 0.915 g/cm3 or about 0.920 g/cm3. In some embodiments, an upper limit for the density of the HMW component may be about 0.950 g/cm3, about 0.940 g/cm3, or about 0.930 g/cm3.

Preferably, the MWD of each component is unimodal and more preferably unimodal and distinct. Preferably, the ratio of the molecular weights of the HMW component and the LMW component, $M_w^H/M_w^L$, is about 1.3 or higher.

In some embodiments, the Mw/Mn of the HMW component is relatively narrow. That is, preferably the Mw/Mn of the HMW component is less than 4.8, more preferably less than or equal to 4.5, most preferably in the range of from about 1.5 to about 4, and especially in the range of from about 2.7 to about 3.1. The density of the HMW component is less than or equal to about 0.949 g/cm3, preferably less than or equal to about 0.945 g/cm3 and more preferably in the range of from about 0.92 to about 0.943 g/cm3.

In other embodiments, the HMW interpolymer component is a homogeneous polymer or is characterized as having a substantially uniform comonomer distribution. Information regarding the relative uniformity of the comonomer distribution for ethylene interpolymers is typically described by the SCBDI (Short Chain Branch Distribution Index) or CDBI (Composition Distribution Branch Index), which are used interchangeably herein. SCBDI is defined as the weight percent of the polymer molecules having a comonomer content within 50 percent of the median total molar comonomer content and represents a comparison of the comonomer distribution in the interpolymer to the comonomer distribution expected for a Bernoullian distribution. The SCBDI of an interpolymer can be readily calculated from TREF as described, for example, by Wild et al., Journal of Polymer Science, Poly. Phys. Ed., Vol. 20, p. 441 (1982); U.S. Pat. No. 4,798,081; U.S. Pat. No. 5,008,204; or L. D. Cady, "The Role of Comonomer Type and Distribution in LLDPE Product Performance," SPE Regional Technical Conference, Quaker Square Hilton, Akron, Ohio, October 1-2, pp. 107-119 (1985), the disclosures of all four of which are incorporated herein by reference.

The preferred TREF technique does not include purge quantities in SCBDI calculations. More preferably, the comonomer distribution of the interpolymer and SCBDI are determined using 13C NMR analysis in accordance with techniques described in U.S. Pat. Nos. 5,292,845; 4,798,081; 5,089,321 and by J. C. Randall, Rev. Macromol. Chem. Phys., C29, pp. 201-317, the disclosures of all four of which are incorporated herein by reference.

In analytical temperature rising elution fractionation analysis (as described in U.S. Pat. No. 4,798,081 and abbreviated herein as "ATREF"), the composition to be analyzed is dissolved in a suitable hot solvent (for example, trichlorobenzene) and allowed to crystallized in a column containing an inert support (stainless steel shot) by slowly reducing the temperature. The column is equipped with both a refractive index detector and a differential viscometer (DV) detector. An ATREF-DV chromatogram curve is then generated by eluting the crystallized polymer sample from the column by slowly increasing the temperature of the eluting solvent (trichlorobenzene). The ATREF curve is also frequently called the short chain branching distribution (SCBD), since it indicates how evenly the comonomer (for example, octene) is distributed throughout the sample in that as elution temperature decreases, comonomer content increases. The refractive index detector provides the short chain distribution information and the differential viscometer detector provides an estimate of the viscosity average molecular weight. The short chain branching distribution and other compositional information can also be determined using crystallization analysis fractionation such as the CRYSTAF fractionalysis package available commercially from PolymerChar, Valencia, Spain.

Accordingly, when the comonomer distribution of the interpolymer component is substantially uniform, it has a SCBDI of greater than 50 percent, especially greater than 70 percent, and most especially greater than about 90, 95, or 99 percent. SCBDI determination clearly distinguishes such polymers from very low density polyethylenes (VLDPEs) which generally have a broad composition distribution as assessed by SCBDI values that are generally less than about 55 percent.

Preferably, the homogeneous copolymers exhibit an essentially singular melting point characteristic, with a peak melting point (Tm), as determined by Differential Scanning Calorimetry (DSC), of from about 60° C. to about 110° C. Preferably the homogeneous copolymer has a DSC peak Tm of from about 80° C. to about 100° C. As used herein, the phrase "essentially single melting point" means that at least about 80 percent, by weight, of the material corresponds to a single Tm peak at a temperature within the range of from about 60° C. to about 110° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

Processes for preparing homogeneous polymers are disclosed in U.S. Pat. No. 5,206,075, U.S. Pat. No. 5,241,031, and PCT International Application WO 93/03093, each of which is hereby incorporated by reference thereto in its entirety. Further details regarding the production and use of one genus of homogeneous ethylene α-olefin copolymers are disclosed in U.S. Pat. No. 5,206,075, to Hodgson, Jr.; U.S. Pat. No. 5,241,031, to Mehta; PCT International Publication Number WO 93/03093, in the name of Exxon Chemical Company; PCT International Publication Number WO 90/03414, in the name of Exxon Chemical Patents, Inc., all four of which are hereby incorporated in their entireties, by reference there. Still another genus of homogeneous ethylene/α-olefin copolymers is disclosed in U.S. Pat. No. 5,272,236, to Lai, et. al., and U.S. Pat. No. 5,278,272, to Lai, et. al., both of which are hereby incorporated in their entireties, by reference thereto.

Homogeneously branched linear ethylene/α-olefin interpolymers may also be prepared using polymerization processes (for example, as described by Elston in U.S. Pat. No. 3,645,992) which provide a homogeneous short chain branching distribution. In his polymerization process, Elston uses soluble vanadium catalyst systems to make such polymers. However, others such as Mitsui Petrochemical Company and Exxon Chemical Company have used so-called single site catalyst systems to make polymers having a homogeneous linear structure. U.S. Pat. No. 4,937,299 to Ewen et al. and U.S. Pat. No. 5,218,071, to Tsutsui et al. disclose the use of catalyst systems based on hafnium for the preparation of homogeneous linear ethylene polymers. Homogeneous linear ethylene/α-olefin interpolymers are currently available from Mitsui Petrochemical Company under the trade name "Tafiner" and from Exxon Chemical Company under the trade name "Exact".

Substantially linear ethylene/α-olefin interpolymers are available from The Dow Chemical Company as Affinity™ polyolefin plastomers. Substantially linear ethylene/α-olefin interpolymers may be prepared in accordance with the techniques described in U.S. Pat. No. 5,272,236, U.S. Pat. No. 5,278,272, and U.S. Pat. No. 5,665,800, which are hereby incorporated by reference.

Other suitable homogeneous ethylene/α-olefin polymers include ultra-low molecular weight polymers made in accordance with the teaching of U.S. Pat. No. 6,054,544, which is hereby incorporated in its entirety.

In yet other embodiments, the HMW ethylene interpolymer component, is characterized as having a reverse comonomer distribution such that a higher amount of comonomer in the interpolymer component is incorporated in the high molecular weight fractions of the interpolymer component. That is, the polymer fractions having a Mw greater than or equal to the average Mw of the interpolymer component are characterized as having a higher weight average amount of comonomer than the polymer fractions having a Mw less than the average Mw of the interpolymer component. For example, in some embodiments, the total molar comonomer content of all polymer fractions having a Mw greater than or equal to 300,000 g/mole will be at least 25 percent higher, more preferably at least 30 percent higher than the molar comonomer content of those polymer fractions having a Mw of less than or equal to 100,000 g/mole.

Reverse comonomer distribution may be quantified as follows. With respect to ethylene copolymer component, when, in cross fractionation chromatography (CFC) of the ethylene copolymer, with respect to extraction at an arbitrary temperature T(°C.) falling within the range of between a first temperature at which a maximum amount of extraction is exhibited and a second temperature which is the lower temperature of either the temperature of 10° C. higher than said first temperature of 96° C., the relationship between the arbitrary temperature T(°C.) and a point in molecular weight on a molecular weight distribution profile of a copolymer fraction extracted at the arbitrary temperature T(°C.) at which point in molecular weight the molecular weight distribution profile of the copolymer fraction shows a peak having a maximum intensity is treated by the least squares method to obtain an approximate straight line within the range of between said first temperature and said second temperature; if there is the copolymer fraction the amount of which is less than 1% by weight on the total amount, excluding purge, of copolymer fraction extracted at temperatures in the overall range of extraction temperatures in CFC, the copolymer fraction can be excluded from the calculation for the approximate straight line; the approximate straight line has a gradient within the range defined by the formula (I):

$$-1 \leq \{\log Mp(T1) - \log Mp(T2)\}/(T1-T2) \leq 0.005 \quad (1)$$

wherein:

T1 and T2 are two different arbitrary extraction temperatures T(°C.) within the range of between the first temperature and the second temperature and Mp(T1) and Mp(T2) are, respectively, molecular weights corresponding to T1 and T2 on said approximate straight line.

In the above formula (I), the term $\{\log Mp(T1) - \log Mp(T2)\}/(T1-T2)$ indicates a gradient of the above-mentioned approximate straight line.

In some embodiments, the cross fraction chromatography (CFC) is conducted using CFC T-150A (manufactured and sold by Mitsubishi Kagaku Corp., Japan). The measurement by CFC is conducted as follows: 20 mg of a sample is dissolved in 20 ml of dichlorobenzene having a temperature of 140° C., to thereby obtain a solution of the sample. Then, 5 ml of the obtained solution is added to a TREF (temperature rising elution fractionation) column filled with glass beads, and the solution is allowed to cool to 0° C. at a rate of 1° C./min. Subsequently, the solution is heated, so as to elevate the temperature of the solution at a rate of 1° C./min, thereby extracting copolymer fractions. Then, the extracted copolymer fractions are subjected to gel permeation chromatography (GPC) using a GPC column Shodex AD806MS (manufactured and sold by Showa Denko K.K., Japan), followed by Fourier transformation infrared spectroscopy (FT-IR) using Nicolet Magna—IR spectrometer 550 (manufactured and sold by Nicolet Co., Ltd., U.S.A.).

With respect to conventional ethylene copolymers produced using a conventional Ziegler catalyst, the gradient $\{\log Mp(T1) - \log Mp(T2)\}/(T1-T2)$ is generally a positive value. With respect to conventional ethylene copolymers produced using conventional metallocene catalysts which have recently been being put into practical use, the gradient $\{\log Mp(T1) - \log Mp(T2)\}/(T1-T2)$ is almost 0, thus they have a substantially uniform comonomer distribution.

The ethylene copolymer component in some embodiments of the invention has a gradient $[\{\log Mp(T1) - \log Mp(T2)\}/(T1-T2)]$ which is relatively large in negative value (within the range of from −0.005 to −1). This indicates that the copolymer has a reverse comonomer distribution. In other words, in the ethylene copolymer component, a copolymer fraction having a high comonomer content has a high molecular weight, contrary to the conventional ethylene copolymers, in which a copolymer fraction having a high comonomer content typically has a low molecular weight.

In some embodiments, the gradient should be preferably within the ranges:

$$-0.5 \leq \{\log Mp(T1) - \log Mp(T2)\}/(T1-T2) \leq 0.007;$$

or, $$-0.1 \leq \{\log Mp(T1) - \log Mp(T2)\}/(T1-T2) \leq 0.01;$$

or $$-0.08 \leq \{\log Mp(T1) - \log Mp(T2)\}/(T1-T2) \leq 0.02;$$

wherein T1, T2, Mp(T1) and Mp(T2) are as defined for the formula (I).

In other embodiments, with respect to the ethylene copolymer component, the amount of such copolymer fractions extracted at temperatures which are at least 10° C. lower than the first temperature as defined above are relatively small. Specifically, when the ethylene copolymer component is measured by CFC, the ethylene copolymer shows characteristics such that the sum of respective amounts of copolymer fractions extracted at temperatures which are at least 10° C. lower than the first temperature as defined above is 8% by weight or less, preferably 5% by weight or less, more preferably 3.5% by weight or less, based on the total amount of copolymer fractions extracted at temperatures in the overall range of extraction temperatures in CFC, but excluding the purge.

In some embodiments, certain fractions of the ethylene copolymer component satisfy the following formula (II):

$$\log(Mt) - \log(Mc) \leq 0.5 \quad (II)$$

wherein Mt is a point in molecular weight on a molecular weight distribution profile at which the profile shows a peak having a maximum intensity, and Mc is an arbitrary point in molecular weight on the molecular weight distribution profile.

The molecular weight distribution profile is obtained together with a comonomer content distribution profile by subjecting the ethylene copolymer to gel permeation chromatography-Fourier transformation infrared spectroscopy (GPC/FT-IR). An approximate straight line is obtained from the comonomer content distribution profile by the least squares method. The line has a gradient (hereinafter "comonomer distribution gradient") defined by the formula (III):

$$\{C(Mc1) - C(Mc2)\}/(\log Mc1 - \log Mc2) \quad (III)$$

wherein:

Mc1 and Mc2 are two different arbitrary points (Mc) in molecular weight which satisfy the formula (II), and C(Mc1) and C(Mc2) are, respectively, comonomer contents corresponding to Mc1 and Mc2 on the approximate straight line.

The comonomer distribution gradient, as defined as Formula (III), may range from about 0.0001 to about 0.1, about 0.0005 to about 0.05, or about 0.001 to about 0.02, although other values outside the ranges are also possible.

As mentioned above, the molecular weight distribution profile and the comonomer content distribution profile can be obtained by subjecting the ethylene copolymer to gel permeation chromatography/Fourier transformation infrared spectroscopy (GPC/FT-IR). For example, the measurement by GPC is conducted using 150C ALC/GPC (manufactured and sold by Waters Assoc. Co. U.S.A.), in which three columns [one Shodex At-807S (manufactured and sold by Showa Denko K.K., Japan) and two TSK-gel GMH-H6 (manufactured and sold by Tosoh Corp., Japan)], which are connected in series, are used, and the measurement by FT-IR is connected by dissolving 20 to 30 mg of a sample in 15 ml of trichlorobenzene having a temperature of 140° C., and applying 500 to 1,000 µl of the resultant solution to a FT-IR apparatus (PERKIN-ELMER 1760X, manufactured and sold by Perkin Elmer Cetus, Co., Ltd., U.S.A.).

As used herein, "comononer content" is defined as a value obtained by dividing the number of comonomer units relative to 1,000 methylene units contained in the copolymer by 1,000. For example, when 5 copolymer units are contained relative to 1,000 methylene units, the comonomer content is 0.005. The value of the comonomer content can be obtained from the ratio of the intensity of an absorbance attributed to the comonomer units to the intensity of an absorbance attributed to the methylene units, which ratio can be obtained by FT-IR. For example, when a linear α-olefin is used as a comonomer, the ratio of the intensity of absorbance at 2,960 cm−1, which is attributed to the methyl groups, to the intensity of absorbance at 2,925 cm−1, which is attributed to the methylene groups, is obtained by FT-IR. From the obtained ratio, the comonomer content can be obtained. The reverse comonomer distribution characteristic as well as cross-fractionation analysis are described in more detail in WO 97/43323, the disclosure of which is incorporated herein by reference.

The novel composition can be made by a variety of methods. For example, it may be made by blending or mixing a LMW high density homopolyethylene component and a HMW ethylene copolymer component. Alternatively, it may be made in a plurality of polymerization reactors.

In some embodiments, the composition is manufactured using at least one metallocene catalyst system either alone or in combination with other metallocene catalyst or a Ziegler-Natta catalyst. Preferably, to ensure the HMW component is characterized as having a reverse comonomer distribution, the metallocene or single-site catalyst system is a constrained geometry catalyst system as described in WO 96/16092 WO 98/27119, and WO 96/28480, the disclosures of which are incorporated herein by reference. In a preferred embodiment of the invention, the novel composition is manufactured using multiple reactors in series or parallel with a metallocene catalyst being fed to each reactor or to just the first reactor. In another preferred embodiment, the same metallocene catalyst system is separately fed into two independently-controlled continuously stirred autoclave slurry reactors (CSTR) configured sequentially.

Preferably, the single-site or metallocene catalyst is supported using an inert material such as silica. More preferably, even where scavengers are used, the single-site or metallocene catalyst is reacted with a suitable co-catalyst (e.g., a boron-containing compound or an alumoxane) which is bonded or fixed to the support in a prior step such that the single-site or metallocene catalyst is immobilized to the extent that substantially no soluble catalyst species is extracted from the support during polymerization, most preferably the species are fixed or bonded such that there is substantially no extraction when the solid catalyst system is boiled in toluene for 2 hours. Suitable single-site catalyst systems for use in manufacturing the novel composition are also described in detail in U.S. Pat. Nos. 6,043,180 and 5,834,393, the disclosures of which are incorporated herein by reference.

While any known polymerization process is thought to be suitable for use in manufacturing the composition, preferably the novel composition is manufactured using a particle-forming polymerization process (that is, a slurry or a gas phase process), more preferably using a slurry polymerization process and most preferably using a slurry loop or slurry autoclave (CSTR) polymerization process comprised of at least two reactors operated sequentially (i.e. in series). Most especially, a dual autoclave sequential polymerization system is used. In a preferred embodiment of the invention, the sequential polymerization is conducted such that fresh catalyst is separately injected in each reactor. Preferably, where separate catalyst injection into each reactor is, no (or substantially no) live polymer or active catalyst is carried over from the first reactor into the second reactor as the polymerization in the second reactor is accomplished only from the injection of a fresh catalyst and monomer (and comonomer) thereto.

In another preferred embodiment, the composition is manufactured using a multiple reactor system (preferably a two reactor system) in series with fresh catalyst feed injection of a supported catalyst system into the first reactor only with process adjustments being made such that live polymer and/or catalyst species is carried over from the first reactor to a subsequent reactor to effect polymerization with fresh monomer and optionally comonomer.

Most preferably, whether separate injection into each reactor is used or injection into the first reactor is used, the resulting composition is characterized as comprising component polymers having distinct, unimodal molecular weight distributions.

For multiple reactor polymerizations, a pressure control device (e.g., a stripper, extrusion valve and/or pump) may be employed in the flow stream between sequential reactors. The above processes are disclosed in U.S. Provisional Patent Application Ser. No. 60/313,176, filed Aug. 17, 2001, entitled "Particle-Form Ethylene Polymerization Process," in the names of Ruddy A. J. Nicasy, et al., which is incorporated by reference herein in its entirety.

In the sequential polymerization, the LMW high density component or the HMW interpolymer component may be manufactured in the first reactor. But due to process control consideration, the HMW component is preferably made in the first reactor.

In addition to sequential polymerization, the novel composition can also be manufactured from single-reactor or multi-reactor component polymers using dry, tumble or extrusion blending techniques.

The HMW interpolymer component comprises ethylene with at least one olefin, preferably a C3-C20 α-olefin or C4-C18 diolefin. Suitable comonomers include, but are not limited to, the C3-C20 α-olefin, such as propylene, isobutylene, 1-butene, 1-hexene, 4-methyl-1-pentene, 1-heptene, 1-octene, 1-nonene, and 1-decene. In some embodiments, the HMW interpolymer component is a copolymer of ethylene and 1-butene. Chain transfer agents can also be used in the polymerization.

Density is measured in accordance with ASTM D-792. Melt index measurements are performed according to ASTM D-1238, Condition 190° C./2.16 kilogram (kg) and Condition 190° C./5 kg, and are known as I2 and I5, respectively. Melt index is inversely proportional to the molecular weight of the polymer. Thus, the higher the molecular weight, the lower the melt index, although the relationship is not linear. Melt index is reported as g/10 minutes. Melt index determinations can also be performed with even higher weights, such as in accordance with ASTM D-1238, Condition 190° C./10 kg and Condition 190° C./21.6 kg, and are known as I10 and I21.6, respectively.

The term "melt flow ratio" is used herein in the conventional sense as the ratio of a higher weight melt index determination to a lower weight determination. For measured I10 and I2 melt index values, the melt flow ratio is conveniently designated as I10/I2. For I21.6 and I10 values, the ratio is designated I21.6/I10.

Gel Permeation Chromatography (GPC) data were generated using either a Waters 150C/ALC, a Polymer Laboratories Model PL-210 or a Polymer Laboratories Model PL-220. The column and carousel compartments were operated at 140° C. The columns used were 3 Polymer Laboratories 10 micron Mixed-B columns. The samples were prepared at a concentration of 0.1 grams of polymer in 50 milliliters of 1,2,4 trichlorobenzene. The 1,2,4 trichlorobenzene used to prepare the samples contained 200 ppm of butylated hydroxytoluene (BHT). Samples were prepared by agitating lightly for 2 hours at 160° C. The injection volume used was 100 microliters and the flow rate was 1.0 milliliters/minute. Calibration of the GPC was performed with narrow molecular weight distribution polystyrene standards purchased from Polymer Laboratories. These polystyrene standard peak molecular weights were converted to polyethylene molecular weights using the following equation (as described in Williams and Ward, J. Polym. Sci., Polym. Let., 6, 621 (1968).

$$M\text{polyethylene} = A \times (M\text{polystyrene})^B$$

where M is the molecular weight, A has a value of 0.4316 and B is equal to 1.0. The molecular weight calculations were performed with the Viscotek TriSEC software.

The GPC data were then deconvoluted to give the most probable fit for two molecular weight components. There are a number of deconvolution algorithms available both commercially and in the literature. These may lead to different answers depending upon the assumptions used. The algorithm summarized here is optimized for the deconvolution problem of the two most probable molecular weight distributions (plus an adjustable error term). In order to allow for the variations in the underlying distributions due to the macromer incorporation and small fluctuations in the reactor conditions (i.e., temperature, concentration) the basis functions were modified to incorporate a normal distribution term. This term allows the basis function for each component to be "smeared" to varying degrees along the molecular weight axis. The advantage is that in the limit (low LCB, perfect concentration and temperature control) the basis function will become a simple, most probable, Flory distribution.

Three components (j=1,2,3) are derived with the third component (j=3) being an adjustable error term. The GPC data must be normalized and properly transformed into weight fraction versus Log10 molecular weight vectors. In other words, each potential curve for deconvolution should consist of a height vector, hi, where the heights are reported at known intervals of Log10 molecular weight, the hi have been properly transformed from the elution volume domain to the Log10 molecular weight domain, and the hi are normalized. Additionally, these data should be made available for the EXCEL application.

Several assumption are made in the deconvolution. Each component, j, consists of a most probable, Flory, distribution which has been convoluted with a normal or Gaussian spreading function using a parameter, µj. The resulting, three basis functions are used in a Chi-square, µ2, minimization routine to locate the parameters that best fit the n points in hi, the GPC data vector.

$$X^2(\mu_j, \sigma_j, w_j) = \sum_{i=1}^{n}\left[\sum_{j=1}^{3} \cdot \sum_{k=1}^{20} w_j \cdot M_i^2 \cdot \lambda_{j,k}^2 \cdot CumND_{j,k} \cdot e^{-\lambda_{j,k} \cdot M_i} \cdot \Delta Log_{10}M - h_i\right]^2$$

$$\lambda_{j,k} = 10^{\mu_j + \frac{k-10}{3} \cdot \sigma_j}$$

The variable, CumNDj,k, is calculated using the EXCEL* function "NORMDIST(x, mean, standard_dev, cumulative)" with the parameters set as follows:

x=µj+(k−10)*µµj/3 mean=µj standard dev=µj cumulative=TRUE

Table 1 below summarizes these variables and their definitions. The use of the Microsoft® EXCEL software application, Solver, is adequate for this task. Constraints are added to Solver insure proper minimization.

TABLE 1

Variable Definitions

| Variable Name | Definition |
|---|---|
| µj, k | Reciprocal of the number average molecular weight of most probable (Flory) distribution for component j, normal distribution slice k |
| µj | Sigma (square root of variance) for normal (Gaussian) spreading function for component j. |
| Wj | Weight fraction of component j |
| K | Normalization term (1.0/Loge 10) |
| Mi | Molecular weight at elution volume slice i |
| hi | Height of log10 (molecular weight) plot at slice i |
| n | Number of slices in Log molecular weight plot |
| i | Log molecular weight slice index (1 to n) |
| j | Component index (1 to 3) |
| 1. k | Normal distribution slice index |
| µlog10M | Average difference between log20Mi and log10Mi−1 in height vs. log10M plot |

The 8 parameters that are derived from the Chi-square minimization are µµ1, µµ2, µµ3, µ1, µ2, µµ3, w1, and w2.

The term w3 is subsequently derived from w1 and w2 since the sum of the 3 components must equal 1. Table 2 is a summary of the Solver constraints used in the EXCEL program.

TABLE 2

Constraint summary

| Description | Constraint |
|---|---|
| Maximum of fraction 1 | w1 < 0.95 (User adjustable) |
| Lower limit of spreading function | µ1, µµ2, µµ3 > 0.001 (must be positive) |
| Upper limit of spreading function | µ1, µµ2, µµ3 < 0.2 (User adjustable) |
| Normalized fractions | w1 + w2 + w3 = 1.0 |

Additional constraints that are to be understood include the limitation that only µj>0 are allowed, although if solver is properly initialized, this constraint need not be entered, as the solver routine will not move any of the µj to values less than about 0.005. Also, the wj are all understood to be positive. This constraint can be handled outside of solver. If the wj are understood to arise from the selection of two points along the interval 0.0<P1<P2 <1.0; whereby w1=P1, w2=P2−P1 and w3=1.0−P2; then constraining P1 and P2 are equivalent to the constraints required above for the wj.

Table 3 is a summary of the Solver settings under the Options tab.

TABLE 3

Solver settings

| Label | Value or selection |
|---|---|
| Max Time (seconds) | 1000 |
| Iterations | 100 |
| Precision | 0.000001 |
| Tolerance (%) | 5 |
| Convergence | 0.001 |
| Estimates | Tangent |
| Derivatives | Forward |
| Search | Newton |
| ALL OTHER SELECTIONS | Not selected |

A first guess for the values of µ1, µ2, w1, and w2 can be obtained by assuming two ideal Flory components that give the observed weight average, number average, and z-average molecular weights for the observed GPC distribution.

$$M_{n,GPC} = \left[ w_1 \cdot \frac{1}{10^{\mu_1}} + w_2 \cdot \frac{1}{10^{\mu_2}} \right]^{-1}$$

$$M_{w,GPC} = [w_1 \cdot 2 \cdot 10^{\mu_1} + w_2 \cdot 2 \cdot 10^{\mu_2}] / M_{n,GPC}$$

$$M_{z,GPC} = [w_1 \cdot 6 \cdot 10^{\mu_1} + w_2 \cdot 6 \cdot 10^{\mu_2}] / M_{w,GPC}$$

$$w_1 + w_2 = 1$$

The values of µ1, µ2, w1, and w2 are then calculated. These should be adjusted carefully to allow for a small error term, w3, and to meet the constraints in Table 2 before entering into Solver for the minimization step. Starting values for µj are all set to 0.05.

Preparative GPC for collecting selected fractions of polymers was performed on a Waters 150C/ALC equipped with preparative pump heads and modified with a 3000 microliter injection loop and 14 milliliter sample vials. The column and carousel compartments were operated at 140° C. The preparative GPC column used was 1 Jordi Associates 5 micron divinylbenzene (DVB) column catalog number 15105. The column dimensions were 500 mm in length and 22 mm inner diameter. 1,2,4 trichlorobenzene was used for both sample preparation and as the chromatographic mobile phase. The samples were prepared at a concentration of 0.1 grams of polymer in 50 milliliters of solvent. The solvent used to prepare the samples contained 200 ppm of butylated hydroxytoluene (BHT). Samples were prepared by agitating lightly for 2 hours at 160° C. The injection volume used was 2,500 microliters and the flow rate was 5.0 milliliters/minute.

Approximately 200-300 injections were made to collect appropriate sample amounts for off-line analysis. 16 fractions were collected spanning the full column elution range, with 8-12 fractions typically spanning the sample elution range. Elution range was verified by refractive index analysis during start-up. The collected solvent fractions were evaporated to approximately 50-60 milliliter volumes with a Buchi Rotovapor R-205 unit equipped with a vacuum controller module V-805 and a heating bath module B-409. The fractions were then allowed to cool to room temperature and the polyethylene material was precipitated by adding approximately 200 milliliters of methanol. Verification of molecular weight fractionation was done via high temperature GPC analysis with refractive index detection. Typical polydispersities of the fractions as measured by GPC analysis were approximately 1.1 to 1.4.

The weight average branching index for selected fractions was obtained from direct determination of intrinsic viscosity and molecular weight at each chromatographic data slice. The chromatographic system consisted of either a Polymer Laboratories Model PL-210 or a Polymer Laboratories Model PL-220 equipped with a Viscotek differential viscometer Model 210R, and a Precision Detectors 2-angle laser light scattering detector Model 2040. The 15-degree angle of the light scattering detector was used for the calculation of molecular weights.

The column and carousel compartments were operated at 140° C. The columns used were 3 Polymer Laboratories 10-micron Mixed-B columns. The solvent used was 1,2,4 trichlorobenzene. The samples were prepared at a concentration of 0.1 grams of polymer in 50 milliliters of solvent. The solvent used to prepare the samples contained 200 ppm of butylated hydroxytoluene (BHT). Samples were prepared by agitating lightly for 2 hours at 160° C. The injection volume used was 100 microliters and the flow rate was 1.0 milliliters/minute.

Calibration of the GPC column set was performed with narrow molecular weight distribution polystyrene standards purchased from Polymer Laboratories. The calibration of the detectors was performed in a manner traceable to NBS 1475 using a linear polyethylene homopolymer. 13C NMR was used to verify the linearity and composition of the homopolymer standard. The refractometer was calibrated for mass verification purposes based on the known concentration and injection volume. The viscometer was calibrated with NBS 1475 using a value of 1.01 deciliters/gram and the light scattering detector was calibrated using NBS 1475 using a molecular weight of 52,000 Daltons.

The Systematic Approach for the determination of multi-detector offsets was done in a manner consistent with that published by Mourey and Balke, Chromatography of Polymers: T. Provder, Ed.; ACS Symposium Series 521; American Chemical Society: Washington, D.C., (1993) pp 180-198 and Balke, et al., ; T. Provder, Ed.; ACS Symposium Series 521; American Chemical Society: Washington, D.C., (1993): pp 199-219, both of which are incorporated herein by reference in their entirety. The triple detector results were compared with polystyrene standard reference material NBS 706 (National Bureau of Standards), or DOW chemical polystyrene resin 1683 to the polystyrene column calibration results from the polystyrene narrow standards calibration curve.

Verification of detector alignment and calibration was made by analyzing a linear polyethylene homopolymer with a polydispersity of approximately 3 and a molecular weight of 115,000. The slope of the resultant Mark-Houwink plot of the linear homopolymer was verified to be within the range of 0.725 to 0.730 between 30,000 and 600,000 molecular weight. The verification procedure included analyzing a minimum of 3 injections to ensure reliability. The polystyrene standard peak molecular weights were converted to polyethylene molecular weights using the method of Williams and Ward described previously. The agreement for Mw and Mn between the polystyrene calibration method and the absolute triple detector method were verified to be within 5% for the polyethylene homopolymer.

Cross fraction chromatography (CFC) is conducted using CFC T-150A (manufactured and sold by Mitsubishi Kagaku Corp., Japan) as follows: 20 mg of a sample is dissolved in 20 ml of dichlorobenzene having a temperature of 140° C., to thereby obtain a solution of the sample. Then, 5 ml of the obtained solution is added to a TREF (temperature rising elution fractionation) column filled with glass beads, and the solution is allowed to cool to 0° C. at a rate of 1° C./min. Subsequently, the solution is heated, so as to elevate the temperature of the solution at a rate of 1° C./min, thereby extracting copolymer fractions. Then, the extracted copolymer fractions are subjected to gel permeation chromatography (GPC) using a GPC column Shodex AD806MS (manufactured and sold by Showa Denko K.K., Japan), followed by Fourier transformation infrared spectroscopy (FT-IR) using a Nicolet Manga—IR spectrometer 550 (manufactured and sold by Nicolet Co., Ltd., USA). Further details of CFC analysis can be found in the catalogue attached to the above-mentioned CFC T-150A. The tensile properties were measured in accordance with ASTM D 638-76.

Fabricated Articles Made from the Novel Compositions

The novel composition is particularly useful in fabricating blow molded articles (especially those characterized as having high topload performance) and transmission or distribution pipes for water and gases, especially pipes that substantially exceed a PE100 performance rating. In other words, the novel composition can be used to increase the service life of the pipe. U.S. Pat. Nos. 6,204,349; 6,191,227; 5,908,679; 5,683,767; 5,417,561, and 5,290,498 disclose various pipes and methods of making the pipes which can be used in embodiments of the invention. As such, the disclosures of all of the preceding patents are incorporated by reference in their entirety.

Many useful fabricated articles can be made from the novel compositions disclosed herein. For example, molding operations can be used to form useful fabricated articles or parts from the compositions disclosed herein, including various injection molding processes (e.g., that described in Modern Plastics Encyclopedia/89, Mid October 1988 Issue, Volume 65, Number 11, pp. 264-268, "Introduction to Injection Molding" by H. Randall Parker and on pp. 270-271, "Injection Molding Thermoplastics" by Michael W. Green, the disclosures of which are incorporated herein by reference) and blow molding processes (e.g., that described in Modern Plastics Encyclopedia/89, Mid October 1988 Issue, Volume 65, Number 11, pp. 217-218, "Extrusion-Blow Molding" by Christopher Irwin, the disclosure of which is incorporated herein by reference), profile extrusion, calandering, pultrusion (e.g., pipes) and the like. Rotomolded articles can also benefit from the novel compositions described herein. Rotomolding techniques are well known to those skilled in the art and include, for example, those described in Modern Plastics Encyclopedia/89, Mid October 1988 Issue, Volume 65, Number 11, pp. 296-301, "Rotational Molding" by R. L. Fair, the disclosure of which is incorporated herein by reference).

Fibers (e.g., staple fibers, melt blown fibers or spunbonded fibers (using, e.g., systems as disclosed in U.S. Pat. Nos. 4,340,563, 4,663,220, 4,668,566, or 4,322,027, all of which are incorporated herein by reference), and gel spun fibers (e.g., the system disclosed in U.S. Pat. No. 4,413,110, incorporated herein by reference), both woven and nonwoven fabrics (e.g., spunlaced fabrics disclosed in U.S. Pat. No. 3,485,706, incorporated herein by reference) or structures made from such fibers (including, e.g., blends of these fibers with other fibers, e.g., PET or cotton)) can also be made from the novel compositions disclosed herein.

Film and film structures can also be made from the novel compositions described herein by using conventional hot blown film fabrication techniques or other biaxial orientation processes such as tenter frames or double bubble processes. Conventional hot blown film processes are described, for example, in The Encyclopedia of Chemical Technology, Kirk-Othmer, Third Edition, John Wiley & Sons, New York, 1981, Vol. 16, pp. 416-417 and Vol. 18, pp. 191-192, the disclosures of which are incorporated herein by reference. Biaxial orientation film manufacturing process such as described in a "double bubble" process as in U.S. Pat. No. 3,456,044 (Pahlke), and the processes described in U.S. Pat. No. 4,352,849 (Mueller), U.S. Pat. No. 4,597,920 (Golike), U.S. Pat. No. 4,820,557 (Warren), U.S. Pat. No. 4,837,084 (Warren), U.S. Pat. No. 4,865,902 (Golike et al.), U.S. Pat. No. 4,927,708 (Herran et al.), U.S. Pat. No. 4,952,451 (Mueller), U.S. Pat. No. 4,963,419 (Lustig et al.), and U.S. Pat. No. 5,059,481 (Lustig et al.), the disclosures of each of which are incorporated herein by reference, can also be used to make film structures from the novel compositions described herein. The film structures can also be made as described in a tenter-frame technique, such as that used for oriented polypropylene.

Other multi-layer film manufacturing techniques for food packaging applications are described in Packaging Foods With Plastics, by Wilmer A. Jenkins and James P. Harrington (1991), pp. 19-27, and in "Coextrusion Basics" by Thomas I. Butler, Film Extrusion Manual: Process, Materials, Properties pp. 31-80 (published by TAPPI Press (1992)) the disclosures of which are incorporated herein by reference.

The films may be monolayer or multilayer films. The film made from the novel compositions can also be coextruded with the other layer(s) or the film can be laminated onto another layer(s) in a secondary operation, such as that described in Packaging Foods With Plastics, by Wilmer A.

Jenkins and James P. Harrington (1991) or that described in "Coextrusion For Barrier Packaging" by W. J. Schrenk and C. R. Finch, Society of Plastics Engineers RETEC Proceedings, Jun. 15-17 (1981), pp. 211-229, the disclosure of which is incorporated herein by reference. If a monolayer film is produced via tubular film (i.e., blown film techniques) or flat die (i.e., cast film) as described by K. R. Osborn and W. A. Jenkins in "Plastic Films, Technology and Packaging Applications" (Technomic Publishing Co., Inc. (1992)), the disclosure of which is incorporated herein by reference, then the film must go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the other physical requirements of the final film. "Laminations Vs. Coextrusion" by D. Dumbleton (Converting Magazine (September 1992)), the disclosure of which is incorporated herein by reference, also discusses lamination versus coextrusion. Monolayer and coextruded films can also go through other post extrusion techniques, such as a biaxial orientation process.

Extrusion coating is yet another technique for producing multilayer film structures using the novel compositions described herein. The novel compositions comprise at least one layer of the film structure. Similar to cast film, extrusion coating is a flat die technique. A sealant can be extrusion coated onto a substrate either in the form of a monolayer or a coextruded extrudate.

Generally for a multilayer film structure, the novel compositions described herein comprise at least one layer of the total multilayer film structure. Other layers of the multilayer structure include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terephthalate (PET), oriented polypropylene (OPP), ethylene/vinyl acetate (EVA) copolymers, ethylene/acrylic acid (EAA) copolymers, ethylene/methacrylic acid (EMAA) copolymers, LLDPE, HDPE, LDPE, nylon, graft adhesive polymers (e.g., maleic anhydride grafted polyethylene), and paper. Generally, the multilayer film structures comprise from 2 to about 7 layers.

EXAMPLES

The following examples are presented to illustrate various embodiments of the invention. They are not intended to be representative of all embodiments of the invention and should be not construed to limit the scope of the claimed invention as described here. All numbers described herein are approximate values and may vary within their accuracy ranges.

Example 1 was produced using an immobilized supported borate constrained geometry catalyst system in a small pilot continuously stirred-tank (autoclave) slurry polymerization system comprised of two reactors configured sequentially. The immobilized solid catalyst system was prepared as follows: Silica gel (948 grade available from Grace-Davidson) was dehydrated at an elevated temperature to a total volatiles content of ca. 3 wt. %. 24.71 kg of the resulting silica was slurried in 130 liters of dry hexane and then treated with 30.88 kg of a 1.21 M solution of triethylaluminum. (TEA) in hexane. The slurry was filtered and washed with fresh, dry hexane (130 liters per wash) at ambient temperature until the residual aluminum in the wash was <0.5 mmol/L. The solids were then isolated by filtration and dried under vacuum (~10 torr) at 60° C. to a residual solvent level of less than or equal to 1.0 wt. %. 1.5 moles of [NHMe(C18-22H37-45)$_2$] [HOC6H4B(C6F5)3], as 16.95 kg of a 10.1 wt. % solution in toluene, was diluted by addition of 9.61 liters (8.32 kg) toluene. This solution was allowed to agitate for 10 minutes and then 1.65 moles of TEA, as 0.88 liters (0.76 kg), of a 1.87 M solution of TEA in toluene was added and the resulting solution allowed to mix for 15 minutes. Then the solid silica/TEA was added over approximately 30 minutes. On completion of the addition, the impregnated material was allowed to mix for 60 minutes. With continuous agitation, 195 liters (128.7 kg) of dry, fresh hexane at ambient was added to the solid and the resulting slurry was allowed to agitate for 30 minutes. Then 1.2 moles of a constrained geometry catalyst, (C5Me4SiMe2NtBu)Ti($\eta$4-1,3-pentadiene) (as 3.69 kg of a 0.223 M solution in heptane), was added and the slurry was mixed for 2 hours. The solvent was removed from the slurry by filtration and the resulting solid washed four times with dry, fresh hexane at ambient and dried under vacuum to provide a free flowing powder.

This immobilized supported borate constrained geometry catalyst system was then charged to a bomb and fed to the catalyst feed vessels of the reactor system which separately injects fresh catalyst into each reactor. In these vessels, the supported catalyst system was further diluted with dry, fresh hexane.

The small pilot slurry dual reactors had a volume of 10 liter and were operated at a liquid level of about 70% (by volume) and agitated at 1000 rpm using a Lightnin A310 mixing blade. The reactor temperature was kept constant by jacket cooling and the melt index was controlled via hydrogen addition while density was controlled via comonomer addition wherein the comonomer was 1-butene in all cases. All feed streams were fed through dip pipe legs in the liquid phase to allow intimate mixing. The diluent was hexane.

Example 1 was provided from by melt-compounding two substantially equivalent pilot reactor runs, Example 1A and Example 1B. Melt-compounding of small yield runs was necessary to provide sufficient quantities for testing and fabrication of articles. The conditions used to produce Example 1A and Example 1B are reported in Table 4a and Table 4b. The first reactor was operated at 65° C. and the ethylene flow rate was 900 gram/hour (consumed), the hydrogen flow rate was 3.55 Nliter/hour in a hexane flow of 2500 g/hour. In order to maintain a constant pressure of 12 bar, 30 micromole/h of Ti was added. In none of the cases was an unbonded cocatalyst added to avoid reactor fouling and no (or a trace amount of) comonomer was added in order to prepare high density polyethylene in the first slurry stirred-tank reactor.

The total contents of the first reactor were continuously dumped into the second slurry stirred-tank reactor which was operated at 75° C. wherein new feed streams were added: 750 g/h ethylene (consumed), no hydrogen flow, and 15 g/h 1-butene in 2500 g/h hexane. The second reactor was operated at a slightly lower pressure (11 bar) to allow dumping from the first into the second reactor. Part of the gas phase of the second reactor was vented in order to control the hydrogen concentration in the liquid phase. Additional catalyst feed was fed to the second reactor to provide a relative production of 48.3% in the first reactor and 51.7% in the second reactor. The relative production per reactor is referred to herein as "split" expressed as a percent or fractionally.

For selected runs, the gas phases in the two reactors were analyzed and the results thereof are reported in Table 5. The contents of the second reactor were continuously transferred to a flash tank operated at a pressure of 1.3 bar and a temperature of 75° C., where the diluent and unreacted monomer and comonomer were flashed off. Flashing resulted in a dry powder. The yields and product properties of Example 1A and Example 1B are provided in Table 6.

Inventive Example 1 was prepared by melt-compounding Examples 1A and 1B with 750 ppm calcium stearate and 3000 ppm Irganox™ B225 on a LEISTRITZ ZSE 60 counter-rotating twin screw extruder. Included in the melt-compounding was a carbon black masterbatch based on DOWLEX™ LLDPE 2384 resin to provide a final carbon black concentration of 2.28 weight percent. The melt-compounding was mild in that the extruder (65 mm, L/D 24) was operated using a temperature profile of 190 to 220° C. at 28 kg/hr and 40 rpm. Inventive Example 1 was fed to achieve a minimal specific energy and the atmosphere on the powder feeder was controlled to be 1-4% oxygen by using a nitrogen purge in the feeding chute. Inventive Example 1 was extruded two times to ensure good homogeneity. Final product properties for Inventive Example 1 can be found in Table 4. Its I5 melt index was 0.27 g/10 minutes and its density was 0.9668 g/cm3.

As described in Tables 4-7, Inventive Example 2 was produced in a manner similar to Inventive Example 1, except Inventive Example 2 did not require blending of duplicative runs to increase available quantities. Inventive Example 2 was stabilized and compounded with carbon black in manner similar to Inventive Example 1 and, as described in Table 7, had an I5 melt index of 0.20 g/10 minutes and a density of 0.9604 g/cm3.

TABLE 4a

Process Conditions for First Reactor

| Example | Reactor Temp. ° C. | Reactor Pressure Bar | Catalyst Flow µmol/h | Cocatalyst Flow g/h | $C_2$ Flow g/h | $C_2$ Vented g/h | $C_2$ Consumed g/h | $H_2$ Flow g/h | $C_4$ Flow g/h | $C_6$ Flow g/h | Stirrer Speed rpm |
|---|---|---|---|---|---|---|---|---|---|---|---|
| 1a | 65 | 12 | 30 | None | 900 | 200 | 700 | 3.55 | 0 | 2500 | 1000 |
| 1b | 65 | 12 | 30 | None | 800 | 200 | 600 | 3.55 | 0 | 2500 | 1000 |
| 2 | 65 | 12 | 13.55 | None | 880 | 200 | 680 | 3.7 | 0 | 2500 | 750 |
| 3a | 65 | 11 | 32.8 | None | 900 | 200 | 700 | 3.55 | 0 | 2500 | 1000 |
| 3b | 65 | 11 | 24 | None | 920 | 200 | 720 | 3.55 | 0 | 2500 | 1000 |
| 3c | 65 | 12 | 34 | None | 950 | 200 | 750 | 3.55 | 0 | 2500 | 1000 |
| 4a | 65 | 12 | 11.25 | None | 962 | 200 | 761.5 | 4.4 | 0 | 2500 | 750 |
| 4b | 65 | 12 | 19.77 | None | 846 | 200 | 645.5 | 3.887 | 0 | 2500 | 750 |

TABLE 4b

Process Conditions for Second Reactor

| Example | Reactor Temp. ° C. | Reactor Pressure bar | Catalyst Flow umol/h | Cocatalyst Flow g/h | $C_2$ Flow g/h | $C_2$ Vented g/h | $C_2$ Consumed g/h | $H_2$ Flow g/h | $C_4$ Flow g/h | $C_6$ Flow g/h | Stirrer Speed Rpm |
|---|---|---|---|---|---|---|---|---|---|---|---|
| 1a | 75 | 11 | 30 | None | 1350 | 600 | 750 | 0 | 15 | 2500 | 1000 |
| 1b | 75 | 11 | 30 | None | 1400 | 600 | 800 | 0 | 15 | 2500 | 1000 |
| 2 | 65 | 11 | 32.8 | None | 1075 | 380 | 695 | 0 | 40 | 2500 | 935 |
| 3a | 75 | 11 | 32.8 | None | 1400 | 600 | 800 | 0 | 15 | 2500 | 1000 |
| 3b | 75 | 11 | 24 | None | 1380 | 600 | 780 | 0 | 15 | 2500 | 1000 |
| 3c | 75 | 11 | 34 | None | 1350 | 600 | 750 | 0 | 15 | 2500 | 1000 |
| 4a | 65 | 11 | 30 | None | 938 | 350 | 588 | 0 | 38 | 2500 | 750 |
| 4b | 65 | 11 | 32.8 | None | 919 | 380 | 539 | 0 | 37.7 | 2500 | 935 |

TABLE 4c

Overall Process Conditions

| Example | Flashtank Temp, ° C. | R1/R2 Split, %/% |
|---|---|---|
| 1a | 75 | 48.3/51.7 |
| 1b | 75 | 42.9/57.1 |
| 2 | 75 | 46.3/53.7 |
| 3a | 75 | 47.4/52.6 |
| 3b | 75 | 48.0/52.0 |
| 3c | 75 | 50.0/50.0 |
| 4a | 75 | 50.5/49.5 |
| 4b | 75 | 52.7/47.3 |

TABLE 5

Gas Analysis in First and Second Reactors

| | First Reactor | | | | | | Second Reactor | | | | | |
|---|---|---|---|---|---|---|---|---|---|---|---|---|
| Example | Butene mol % | Nitrogen mol % | Ethylene mol % | Hexane mol % | Hydrogen mol % | Ethane mol % | Butene mol % | Nitrogen mol % | Ethylene mol % | Hexane mol % | Hydrogen mol % | Ethane mol % |
| 2 | 0.00 | 1.17 | 94.58 | 1.46 | 1.34 | 0.00 | 0.47 | 0.56 | 95.07 | 1.81 | 0.02 | 0.00 |
| 3a | 0.01 | 1.14 | 90.7 | 3.99 | 1.41 | 0.17 | 0.28 | 0.7 | 93.3 | 2.92 | 0.17 | 0.01 |
| 4a | 0.00 | 0.83 | 92.35 | 3.02 | 1.27 | 0.22 | 0.42 | 0.82 | 91.33 | 4.49 | 0.03 | 0.15 |
| 4b | 0.00 | 1.17 | 95.19 | 1.63 | 1.27 | 0.00 | 0.45 | 0.54 | 95.05 | 2.43 | 0.02 | 0.00 |

TABLE 6

Production and Product Properties of Inventive Example

| Example | Run Time hours | Product Yield Kg | $I_{21}$ g/10 min | $I_5$ g/10 min | $I_{21}/I_5$ | Density g/cm$^3$ | FTIR Butene mol % | DSC Crystallinity % | $RCD_1$ |
|---|---|---|---|---|---|---|---|---|---|
| 1a | 12 | 6.5 | 10 | .32 | 31.4 | 0.9576 | .475 | 77.76 | Yes |
| 1b | 6 | 5.5 | 12.6 | 0.41 | 30.7 | 0.9591 | 0.5 | 77.53 | Yes |
| 2 | 15 | 18 | 4.22 | 0.21 | 20.1 | 0.9501 | ND | 74 | Yes |
| 3a | 10 | 5.8 | 8.50 | 0.4 | 21.3 | 0.9554 | 0.55 | 76.35 | Yes |
| 3b | 12 | 5.5 | 7.75 | 0.3 | 25.2 | 0.9547 | 0.57 | 77.84 | Yes |
| 3c | 7 | 3.8 | 8.37 | 0.4 | 20.9 | 0.954 | 0.69 | 74.34 | Yes |
| 4a | 13 | 12 | 9.55 | 0.47 | 20.3 | 0.9518 | ND | 68.8 | Yes |
| 4b | 12 | 9 | 8.63 | 0.39 | 22.1 | 0.9504 | ND | ND | Yes |

ND denotes "not determined"

TABLE 7

Product Properties of Inventive Examples and Comparative Runs

| Example | Inventive Example 1 | Inventive Example 2 | Inventive Example 3 | Inventive Example 4 | comparative run 1 | comparative run 2 |
|---|---|---|---|---|---|---|
| $I_5$ g/10 min. | 0.27 | 0.20 | 0.42 | 0.41 | 0.21 | 0.40 |
| $I_{10}$ g/10 min. | ND | 0.69 | ND | 1.37 | 0.85 | ND |
| $I_{21.6}$ g/10 min. | 5.28 | 4.36 | 8.75 | 8.14 | 6.21 | 9.39 |
| $I_{21.6}/I_5$ | 19.6 | 21.8 | 20.8 | 19.9 | 29.6 | 22.7 |
| Density, g/cm$^3$ | 0.9668 | 0.9604 | 0.9640 | 0.9611 | 0.9640 | 0.9593 |
| GPC $M_w$ | 216,500 | 229,900 | 209,000 | 200,800 | 239,200 | ND |
| GPC $M_w/M_n$ | 15.3 | 17.4 | 15.5 | 12.6 | 19.1 | ND |
| RCD | Yes | Yes | Yes | Yes | No | No |
| Yield Stress, MPa | 26.7 | 23.5 | 26.9 | 23.7 | 25.0 | 23.1 |

ND denotes not determined

As described in Tables 4-6, for Inventive Example 3, which consisted of melt-compounding three substantially equivalent polymerization runs to provide sufficient quantities (i.e., Examples 3a, 3b and 3c), each run was conducted in a manner similar to that described above for Inventive Example 1. Inventive Example 3 was stabilized and compounded with carbon black in manner similar to Inventive Example 1 and, as described in Table 7, had an I5 melt index of 0.42 g/10 minutes and a density of 0.9640 g/cm$^3$. As described in Tables 4-6, for Inventive Example 4, which consisted of dry blending two substantially equivalent polymerization runs to provide sufficient quantities (i.e., Examples 4a and 4b), each run was conducted in a manner similar to that described above for Inventive Example 1. Inventive Example 4 was stabilized and compounded with carbon black in manner similar to Inventive Example 1 and, as described in Table 7, had an $I_5$ melt index of 0.41 g/10 minutes and a density of 0.9611 g/cm$^3$.

Comparative run 1 consisted of HOSTALEN CRP 100, supplied commercially by BASELL as a PE100 pressure pipe resin. Comparative run 1 had an $I_5$ melt index of 0.21 g/10 minutes and a density of 0.9640 g/cm$^3$ and is recognized in the pressure pipe industry as the PE100 resin with the highest hydrostatic strength. HOSTALEN CRP 100 is manufactured exclusively with Ziegler-Natta catalyst in a dual reactor system.

Comparative run 2 consisted of a HDPE PE100 pressure pipe resin. Comparative run 2 had an $I_5$ melt index of 0.40 g/10 minutes and a density of 0.9593 g/m$^3$. Like CRP 100, this resin is manufactured using a conventional Ziegler-Natta catalyst system. Differential scanning calorimetry analysis was performed using a Seiko DSC to determine crystallinity and peak melting point.

Figure 2:
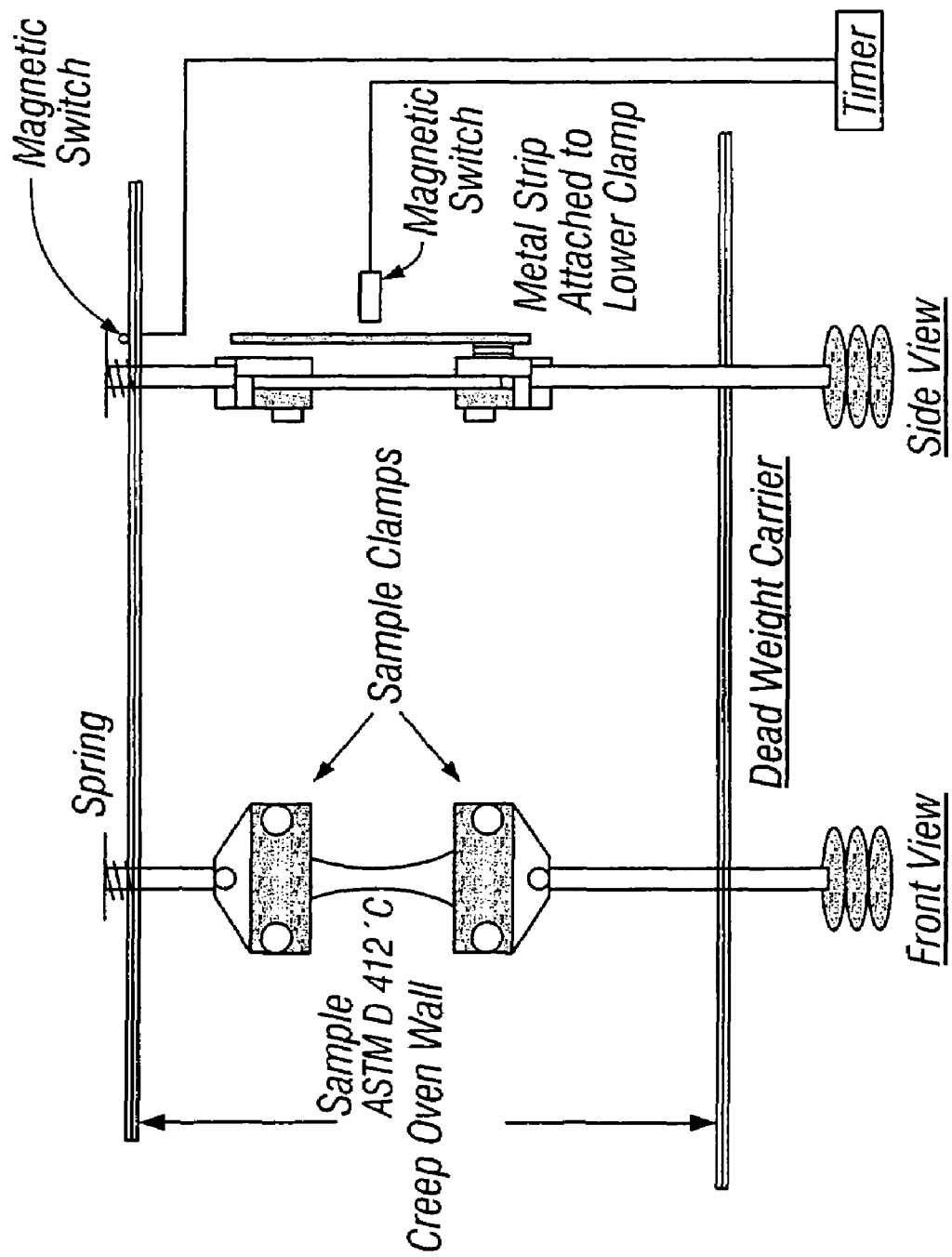
FIG. 2 is a schematic of the creep rupture testing rig used to evaluate inventive examples.

Creep rupture tests were performed on a Frank type 68317 creep rig equipped with 15 sample stations. FIG. 2 shows the rig, except a front and side view of only one sample station is illustrated and not all 15 sample stations. The rig was equipped with an optical extensiometer for strain measurements and with an oven to allow testing at elevated temperatures. Creep test samples (i.e., dogbones) were punched out of compression molded rectangular plagues having a nominal thickness of about 2 mm. The dimensions of the dogbone test bars were in accordance with ASTM D412, specimen type C. The compression molding conditions for the plaques were in accordance with ASTM D1928. The cross sectional area of each individual test sample was measured separately to ensure accuracy in calculation of the load to be applied to obtain the required stress level. In the testing, time to failure as well as creep behavior was monitored using the optical extensiometer mounted on the creep rig. To monitor creep behavior, two marker lines were drawn on the middle section of the samples over their entire width at a distance of 35 mm apart. For testing at elevated temperatures, the oven was heated to the desired temperature before test samples were placed therein. After the oven had equilibrated at a desired elevated temperature, it was switched off, the oven was opened and the samples were placed therein, then the oven door was closed and the oven was switched back on. This procedure took 10-15 minutes wherein the oven reached thermal equilibrium quickly after placement of the samples. One hour after closing the creep oven door, zero strain was measured and the samples were loaded. At appropriate times, the elongation of the sample was determined using the optical extensiometer to obtain a creep curve. The time to failure was measured with a timer that was operated by both a mechanical switch and a magnetic switch as shown in FIG. 2. The timer was only activated when both switches were in the "on" position. Each sample station in the creep rig had its own timer.

Upon loading, the spring on top of the creep rig was squeezed causing the mechanical switch to activate the timer. The metal strip on the bottom sample clamp kept the magnetic switch activated. As the metal strip traveled downwards as the sample elongated during the testing, the magnetic switch stopped the timer at an elongation that depended on the positioning of the strip on the clamp. An adjustable strip was mounted such that the timer switched off at an elongation of 200 percent. The timer allowed time to failure to be determined to an accuracy of 0.05 hour.

TABLE 9

Minimum Hoop Stress Requirements for PE100

| Temperature °C. | Hoop Stress MPa | Min. Time to Failure Hours |
|---|---|---|
| 20 | 12.4 | >100 |
| 80 | 5.5 | >165 |
| 80 | 5 | >1000 |

TABLE 10

Hoop Stress Performance

| Inventive Example | Temp. °C. | Outside Diameter mm | Minimum Wall Thickness mm | Pressure bar | Hoop Stress MPa | Failure Time hours |
|---|---|---|---|---|---|---|
| 2 | 20 | 32.00 | 2.85 | 24.22 | 12.39 | >3397 |
| 2 | 60 | 31.90 | 2.81 | 15.50 | 8.02 | >8088 |
| 2 | 60 | 31.90 | 2.66 | 14.51 | 7.98 | >8088 |
| 2 | 60 | 32.00 | 2.78 | 14.51 | 7.63 | >8088 |
| 2 | 60 | 31.95 | 2.86 | 14.91 | 7.58 | >8088 |
| 2 | 80 | 31.80 | 2.79 | 10.59 | 5.51 | >8088 |
| 2 | 80 | 31.85 | 2.86 | 10.79 | 5.47 | >8088 |
| 2 | 80 | 32.00 | 2.80 | 9.61 | 5.01 | >8088 |
| 2 | 80 | 31.82 | 2.79 | 9.61 | 5.00 | >8088 |
| 2 | 80 | 31.97 | 2.82 | 9.51 | 4.89 | >8088 |
| 3 | 20 | 31.90 | 2.78 | 23.73 | 12.43 | >8040 |
| 3 | 60 | 31.90 | 2.88 | 15.89 | 8.00 | 5819 |
| 3 | 60 | 31.90 | 2.85 | 15.69 | 8.00 | 7412 |
| 3 | 60 | 31.90 | 2.81 | 14.71 | 7.61 | >8040 |
| 3 | 60 | 31.90 | 2.82 | 14.71 | 7.61 | >8040 |
| 3 | 80 | 31.90 | 2.89 | 10.98 | 5.51 | 2098 |
| 3 | 80 | 31.90 | 2.90 | 10.98 | 5.49 | 1525 |
| 3 | 80 | 31.90 | 2.85 | 9.81 | 5.00 | 1936 |
| 3 | 80 | 31.90 | 2.86 | 9.81 | 4.98 | 4115 |
| 3 | 80 | 31.90 | 2.91 | 9.81 | 4.89 | 1967 |
| 4 | 20 | 32.00 | 2.80 | 23.73 | 12.38 | 3372 |
| 4 | 60 | 32.00 | 2.82 | 15.50 | 8.02 | 4251 |
| 4 | 60 | 32.00 | 2.82 | 15.50 | 8.02 | 3271 |
| 4 | 60 | 32.00 | 2.80 | 14.51 | 7.57 | >8064 |
| 4 | 60 | 32.00 | 2.78 | 14.51 | 7.63 | >8064 |
| 4 | 80 | 32.00 | 2.81 | 10.79 | 5.60 | >8064 |
| 4 | 80 | 32.00 | 2.81 | 10.59 | 5.50 | >8064 |
| 4 | 80 | 32.00 | 2.81 | 10.59 | 5.50 | >8064 |
| 4 | 80 | 32.00 | 2.84 | 10.10 | 5.19 | >8064 |
| 4 | 80 | 32.00 | 2.69 | 9.22 | 5.02 | >8064 |
| 4 | 80 | 32.00 | 2.81 | 9.61 | 4.99 | >8064 |
| 4 | 80 | 32.00 | 2.83 | 9.51 | 4.90 | >8064 |

TABLE 8

Actual and Calculated Creep Rupture Lifetimes at Different Temperatures and Stresses

| Temp. °Kelvin | Stress MPa | comp. run 1 Actual Lifetime | Inventive Example 1 Actual Lifetime | Inventive Ex. 1 Calculated Lifetimes | | | comp. run 2 Actual Lifetime | Inventive Example 2 Actual Lifetime | Inventive Example 2 Calculated Lifetimes | | |
|---|---|---|---|---|---|---|---|---|---|---|---|
| | | | | Equation 1 | Equation 2 | Equation 3 | | | Equation 1 | Equation 2 | Equation 3 |
| 296 | 12.49 | 2483 | 3966 | 3494 | 3481 | 3472 | ND | 2590 | ND | ND | ND |
| 296 | 12.6 | 2406 | 3623 | 3379 | 3366 | 3358 | 1217 | 2620 | 1640 | 1634 | 1630 |
| 296 | 12.94 | 1670 | ND | 2294 | 2285 | 2280 | 568 | 1410 | 731 | 728 | 726 |
| 296 | 13.4 | 450 | 1305 | 571 | 569 | 567 | 309 | 890 | 338 | 382 | 381 |
| 333 | 7.93 | 552 | ND | 1304 | 1635 | 1820 | 1320 | 10000 | 3288 | 4122 | 4589 |
| 333 | 8.17 | 700 | 2000 | 1678 | 2103 | 2342 | 300 | ND | 683 | 856 | 953 |
| 333 | 8.34 | 350 | 1100 | 804 | 1008 | 1123 | 120 | 475 | 258 | 324 | 361 |
| 333 | 8.69 | 90 | 320 | 190 | 239 | 266 | ND | 83 | ND | ND | ND |
| 353 | 6.3 | 225 | 4320 | 663 | 923 | 1080 | 552 | ND | 1719 | 2391 | 2798 |
| 353 | 6.37 | 215 | 6528 | 632 | 880 | 1029 | 313 | 2850 | 942 | 1310 | 1533 |
| 353 | 6.54 | 22 | 969 | 56 | 78 | 92 | 140 | 200 | 401 | 558 | 653 |
| 353 | 6.68 | 30 | 135 | 32 | 109 | 127 | 10 | 119 | 24 | 34 | 40 |

ND denotes not determined or calculated.

Table 8 compares the lifetimes of the different examples for stresses at 23, 60 and 80° C. Comparing Inventive Example 1 to comparative run 1 and Inventive Example 2 to comparative run 2, it is clear that for all of the tested stresses and temperatures, the lifetimes of the inventive examples were significantly longer than those of the comparative runs.

To describe the lifetime differences, the algebraic equations were developed. For comparative run lifetime $t_1$, inventive example lifetime $t_2$ was longer at a given T (in Kelvin) as follows:

Preferably $\log t_2 \geq 1.0607 \times \log t_1 + 2.324 - 707/T$  equation (1)

More preferably $\log t_2 \geq 1.0607 \times \log t_1 + 3.221 - 971/T$  equation (2)

Most preferably $\log t_2 \geq 1.0607 \times \log t_1 + 3.649 - 1098/T$  equation (3).

A comparison of the measured lifetimes of the inventive examples with calculated lifetimes using equation 1-3 above is also given in Table 8.

For hoop stress comparisons, PE100 pressure requirements according to European norm ISO/DIS 4437 are shown in Table 9. In addition to the above creep rupture lifetime data, Table 10 shows that inventive examples also exhibit superior hoop stress when the hydrostatic strength of pipe samples of 32 mm SDR 11 were measured according to ISO 1167. Accordingly, it is clear from Tables 8-10 that the inventive examples far exceed standard requirements for PE100 pressure pipe.

In another evaluation, two additional inventive examples were produced. These examples, Inventive Example 5 and 6, were manufactured in the same reactor system in a manner substantially equivalent to that described above for Inventive Example 1, including melt-compounding to increase sample quantities. But instead injection of fresh catalyst into each reactor as was the case for Inventive Example 1, for these examples, fresh catalyst was injected into the first reactor only and no catalyst was injected into the second reactor. Also, process conditions were adjusted such that the catalyst remained active in both reactors. Additionally, Inventive Examples 5 and 6 were identical except for additive compounding. Table 11 provides the product and performance data as well as the additive compounding data for these inventive examples.

The critical strain energy release rate GC was measured in the Charpy mode in accordance with the procedure described by E. Plati and J. G. Williams in *Polymer Engineering and Science*, June 1975, Volume 15, No 6, pp. 470 to 477, the disclosure of which is incorporated herein by reference. For each temperature at least 6 samples are used. The sample dimensions are 125 mm×10 mm×10 mm. The bars are machined out of thick compression molded sheets. The procedure used to mold these sheets was a modification of the procedure outlined in "A compression molding technique for thick sheets of thermoplastics" by M. J. Cawood and G. A. H. Smith in *Polymer Testing*, 1 (1980), 3-7, the disclosure of which is incorporated herein by was used.

Thus samples were compression molded in a 10 mm thick mold, laterally insulated using Teflon™. The samples were heated up to 160° C. and kept at 6.7 MPa for three minutes followed by three one minute cycles of exertion and release. Excessive flash was removed. The material was then heated to 180° C. and kept for about 5 minutes at 6.7 MPa, which was also exerted and released for 3 cycles of one minute each. Finally, the melt was solidified under a pressure of 1.7 MPa and slowly cooled overnight by switching of the heating.

The Pennsylvania Notch Test (PENT), a slow crack growth test was performed following the procedure described by X. Lu and N. Brown, *Polymer Testing*, 11 (1992), pages 309-319, the disclosure of which is incorporated herein by reference. In the PENT method, a single edge notched test specimen is exposed to a constant load at a well-controlled temperature. The time to failure can be measured with a timer and the rate of failure can be measured with a microscope or a dial gauge. The notch depth is generally about 35% of the sample thickness. The width of the notch may vary from about 15 to about 25 mm and the side grooves can vary from about 0.5 to about 1.0 mm depending on the width of the specimen.

A notch is made in the sample by pressing a fresh razor blade into the specimen at a speed of about 300 μ/min. At speeds of about 300 μ/min avoids notch tip damage and still provides a reasonably short notching time. At notching speeds of greater than about 525 μ/min, the failure time is significantly increased. Notching speeds for the side grooves is not particularly important. The apparatus should ensure that the notch and side grooves are coplanar.

During testing care should be taken to ensure that the specimen grips appropriately arranged. To that end, the grips should be aligned and centered with respect to the longitudinal axis of the specimen. During gripping the notch should not be activated by bending or twisting the specimen. An alignment jig may be used to aid in properly gripping the specimen to align the grips and avoid bending or twisting the specimen. In addition, the grips should have serrated faces to prevent slippage and the ends of the grips should be at least 10 mm from the notch.

The testing apparatus may be a direct loading device or a lever loading device. A 5:1 a lever on ratio has been found to be very convenient. The grips may be attached to the loading machine by tabs which have a universal action of that the applied to load is pure tension.

The applied stress is based on the unnotched cross-sectional area. The value of the applied stress depends on the testing temperature. The recommended value is that which produces brutal fracture as fast as possible. Higher stresses produced ductile failure and lower stresses along the testing time. For polyethylenes, the maximum stress for brittle failure, the applied stress should have the values of 5.6, 4.6, 4.2, and 2.4 MPa. at temperatures of 23, 42, 50, 80° C., respectively. In general, the stress for brittle failure by slow crack growth should be less than one half the yield point in that particular testing temperature.

The temperature should be controlled within ±0.5° C. It is not recommended that polyethylene be tested above 80° C. because significant morphological changes can occur during the test. Generally, depending on the test temperature, a 1° C. change in the past temperature will change the time to failure by about 10-15%.

A simple timer may be used to record the failure time. The timer should be configured to switch off when the specimen fractures. The rate of slow crack growth can be monitored with a microscope with a 2-100× magnification by measuring the crack opening displacement versus time. A dial indicator which measures the overall extension of the specimen can also detect the onset of crack initiation.

The PENT measurements reported herein were conducted at 2.4 MPa and 80° C. The sample dimensions were 50 mm×25 mm×10 mm and were machined from the same sheet as the $G_C$ bars.

Viscosities were measured on a Rheometrics mechanical spectrometer (RMS) at 190° C. in the oscillatory mode.

Melt strength determinations are made at 190° C. using a Goettfert Rheotens and an Instron capillary rheometer. The capillary rheometer is aligned and situated above the Rheotens unit and delivers, at a constant plunger speed of 25.4 mm/min., a filament of molten polymer to the Rheotens unit. The Instron is equipped with a standard capillary die of 2.1 mm diameter and 42 mm length (20:1 L/D) and delivers the filament to the toothed take-up wheels of the Rheotens unit rotating at 10 mm/s. The distance between the exit of the Instron capillary die and the nip point on the Rheotens take-up wheels was 100 mm. The experiment to determine melt strength began by accelerating the take-up wheels on the Rheotens unit at 2.4 mm/s², the Rheotens unit is capable of acceleration rates from 0.12 to 120 mm/s². As the velocity of the Rheotens take-up wheels increase with time, the draw down force was recorded in centiNewtons (cN) using the Linear Variable Displacement Transducer (LVDT) on the Rheotens unit. The computerized data acquisition system of the Rheotens unit records the draw down force as a function of take-up wheel velocity in cN/sec. The actual melt strength value is taken from the plateau of the recorded draw down force in cN. The velocity at filament break was also recorded in cm/sec as the melt strength break speed.

TABLE 11

Product and Performance Properties of Inventive Examples

| | | Inventive Example | | |
|---|---|---|---|---|
| | | 2 | 5 | 6 |
| Melt-Index | | | | |
| $I_5$ | g/10 min | 0.21 | 0.25 | 0.25 |
| $I_{21.6}$ | g/10 min | 4.71 | 5.04 | 6.31 |
| $I_{21.6/5}$ | | 22.43 | 20.16 | 25.24 |
| Density | g/cm³ | 0.9511 | 0.9508 | 0.9508 |
| Butene (FTIR) | mole % | 0.53 | 0.45 | ND |
| GPC | | | | |
| $M_w$ | | 229900 | 223100 | 201400 |
| $M_n$ | | 13213 | 15200 | 15700 |
| $M_w/M_n$ | | 17.4 | 14.68 | 12.83 |
| $M_z$ | | | 832600 | 727200 |
| RCD (Fractionation) | | Yes | Yes | Yes |
| Calcium Stearate | ppm | | 680 | |
| Irganox ™ 1010 | ppm | 2080 | 845 | 329 |
| Irgafos ™ 168 total | ppm | 2691 | | 1900 |
| Irgafos ™ 168 remaining | ppm | 2784 | 2000 | 1723 |
| DSC | | | | |
| $T_o$ | ° C. | 122.2 | 122.1 | 121.2 |
| $T_m$ | ° C. | 133.2 | 134.4 | 133.1 |
| Crystallinity | % | 72.77 | 68.11 | 69.0 |
| OIT ° C. | min. | 66 | 46 | 50 |
| PENT | min. | >464484 | >179796 | >150000 |
| $G_c$ Brittle Ductile, ° C. | | | | |
| 40 | kJ/m² | | | |
| 23 | kJ/m² | 33 | 36.7$^d$ | 39.8$^d$ |
| 0 | kJ/m² | | | |
| −5 | | | | |
| −10 | kJ/m² | | 21.5$^d$ | 23.2$^d$ |
| −20 | kJ/m² | 18.4 | 17.7$^d$ | 21.0$^d$ |
| −30 | kJ/m² | | 17.1$^d$ | 17.4$^d$ |
| −40 | kJ/m² | | 14.5$^d$ | 17.1$^d$ |
| −50 | kJ/m² | | 13.6$^d$ | 12.5$^b$ |
| −60 | kJ/m² | | 12.8$^b$ | 12.0$^b$ |
| IZOD | kJ/m² | 545 | 44.6 | 44.7 |
| Tensile properties | | | | |
| Yield stress | MPa | 23.1 | 23.7 | 24.8 |
| Yield strain | % | 11.7 | 10.6 | 11.0 |
| Break stress | MPa | 36.6 | 42.4 | 42.2 |
| Ultimate tensile stress | MPa | 36.6 | 42.4 | 42.2 |
| Elongation | % | 673 | 683 | 697 |
| Secant modulus | MPa | 556 | 622 | 614 |
| Young's modulus | MPa | 954 | 1044 | 957 |
| 3 point flex. modulus | MPa | 831 | 918 | 983 |
| Rheology | | | | |
| viscosity @ .1/s | | 88371 | 86924 | 81283 |
| viscosity @ 100/s | | 3100 | 2879 | 2680 |
| Power law k | | 37311 | 35654 | 34597 |
| Power law N | | 0.50565 | 0.4972 | 0.4747 |
| Melt-Tension | | | | |
| Screw | rpm | | 27.9 | 27.0 |
| Pressure | Bar | | 107 | 115 |

TABLE 11-continued

Product and Performance Properties of Inventive Examples

| | | Inventive Example | | |
|---|---|---|---|---|
| | | 2 | 5 | 6 |
| $V_o$ | cm/sec | | 3.1 | 3.2 |
| $V_z$ | cm/sec | | 46.0 | 53 |
| $M_e$ | | | 13.84 | 15.56 |
| Force | cN | | 44.0 | 38.0 |
| $T_z$ | cN/sec | | 8225 | 8675 |
| Swell | % | | 127 | 122 |

[b] indicates brittle failure mode observed;
[d] indicates ductile failure mode observed.

Figure 3:
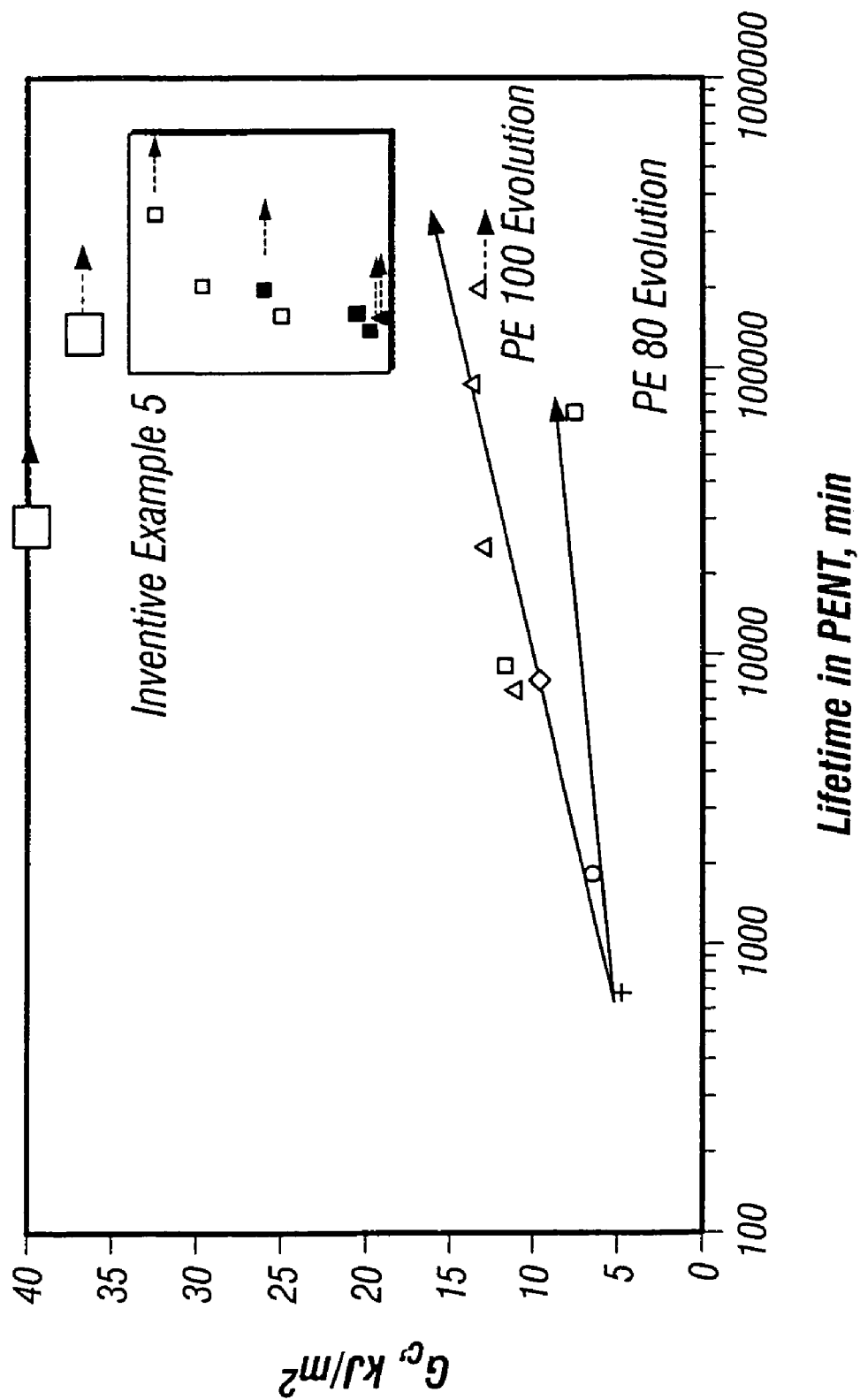
FIG. 3 is a plot of Gc versus PENT performance for Inventive Example 6 as compared to standard PE 100 and PE80 resin performance.
Figure 4:
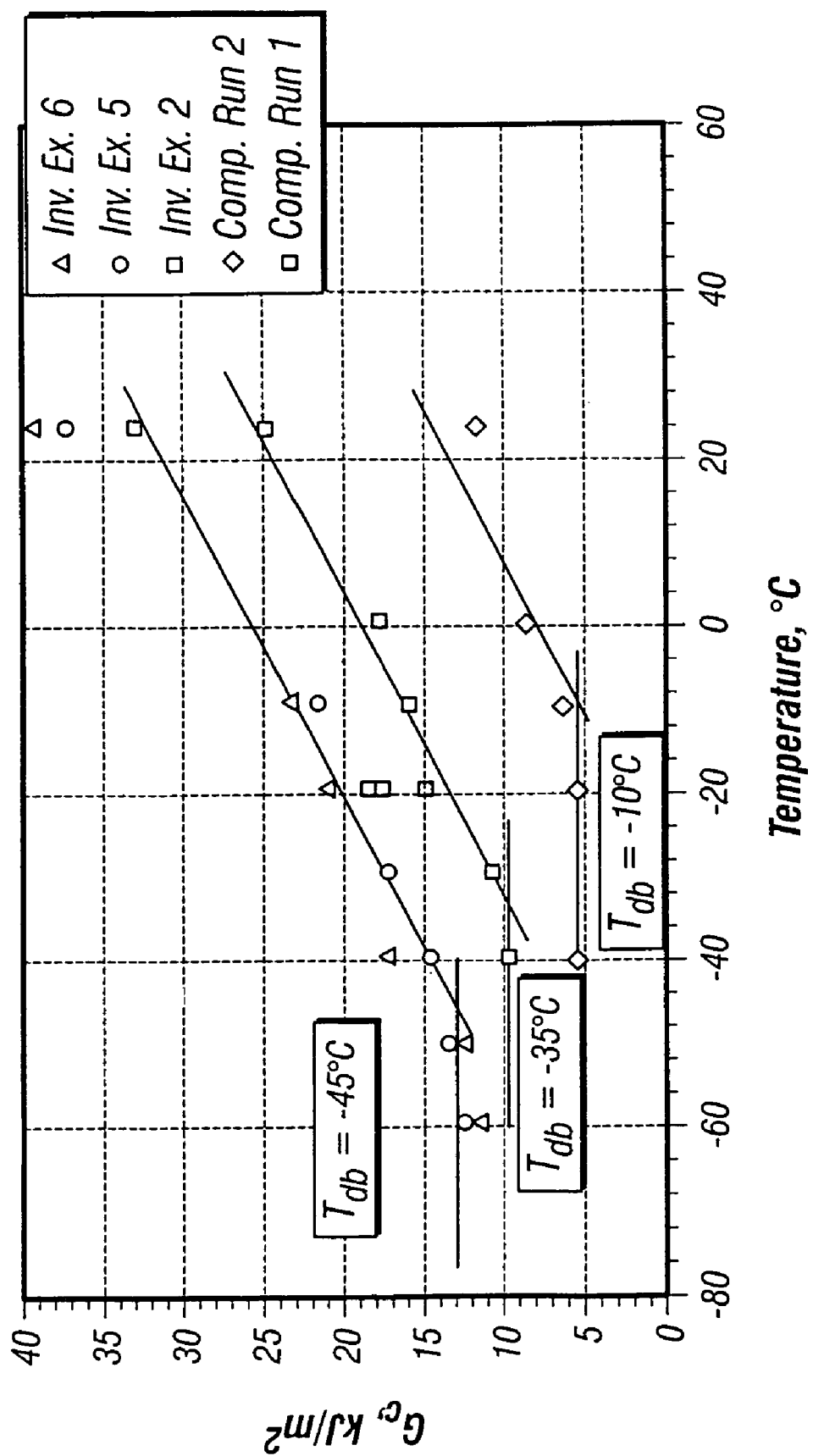
FIG. 4 is a plot of RCP (based on Gc data) for inventive examples and comparative runs.
Figure 5:
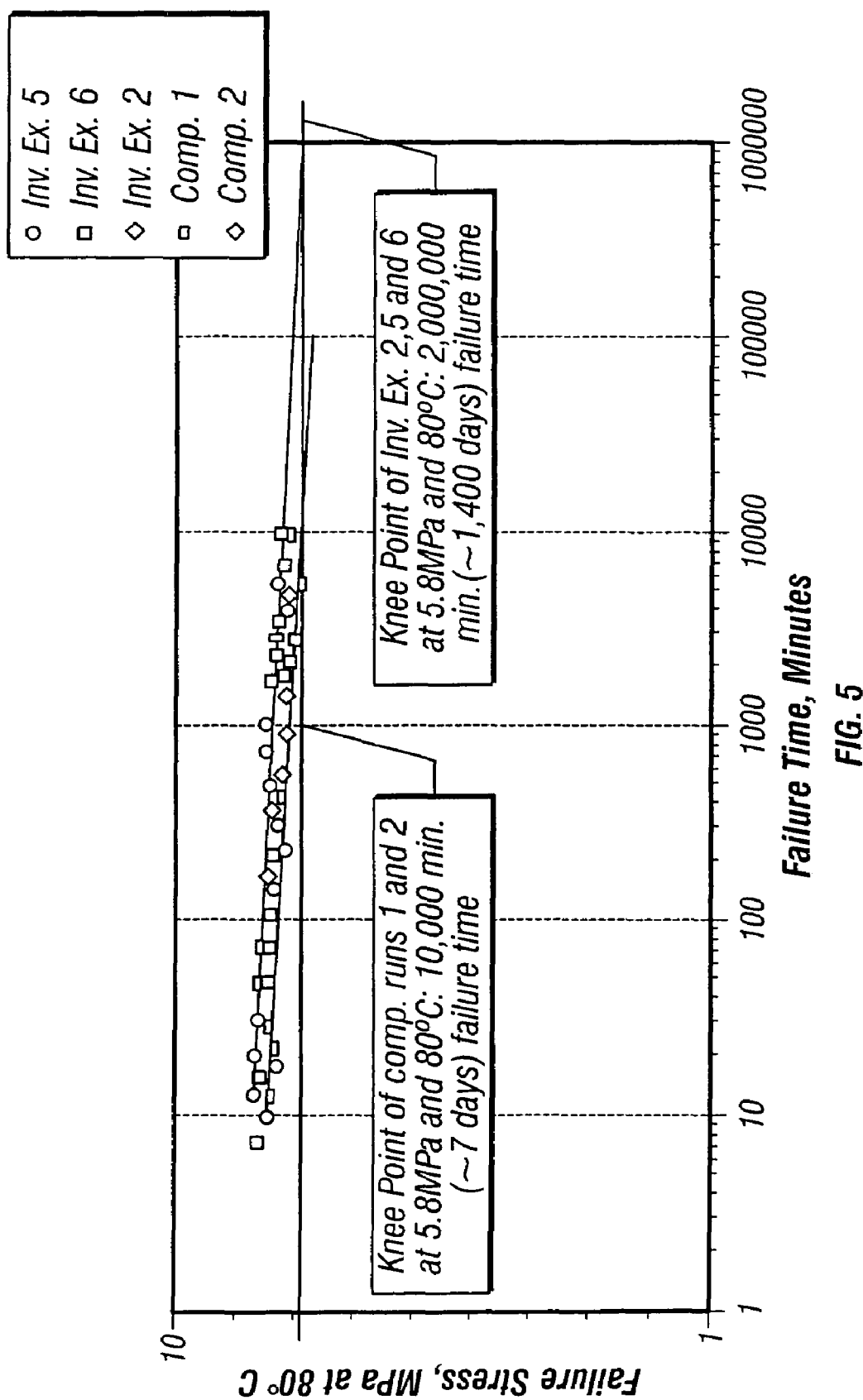
FIG. 5 is a plot of creep rupture performance for inventive examples and comparative runs.

From data in Table 11, plots illustrating the low temperature ductile break point as well as the slow crack growth and rapid crack propagation performances (based on $G_c$ and PENT data) were prepared. FIG. 2 shows Inventive Example 5 has an outstanding balance of slow crack growth and rapid crack propagation performance relative to PE80 and PE100 standards. FIG. 3 shows Inventive Examples 2, 5 and 6 have excellent low $T_{db}$. Further, actual creep rupture testing was also performed on various inventive examples in direct comparisons with comparatives run 1 and 2. FIG. 4 indicates that while at 80° C. and a stress of 5.8 MPa the lifetime for the comparative runs was approximately seven (7) days, the lifetime for Inventive Examples 2, 5 and 6 was extrapolated to 1400 days (i.e., 2,000,000 minutes or 33,000 hours).

In another evaluation, the differences between dual catalyst injection and single catalyst injection were further investigated. In this evaluation, Inventive Example 7 was manufactured via dual catalyst injection and Inventive Example 8 was manufactured via single catalyst. The same supported borate CGC catalyst system as used for Inventive Example 1 was used in each manufacture.

For Inventive Example 7, the polymerization was conducted continuously in a first continuously stirred autoclave tank reactor (CSTR), operating at a liquid volume of 130 liter of hexane diluent. The catalyst was injected as a slurry using hexane as carrier into the liquid of the reactor. The reactor was controlled at a constant liquid temperature by circulation of cold water in the cooling jacket of the reactor. Hexane, ethylene and hydrogen were fed to this first reactor. The melt index of the powder produced in the reactor was controlled by the hydrogen flow rate. The liquid volume of 130 liter was controlled by transferring slurry from the first reactor to a stripper.

The stripper had a liquid volume of 110 Liter and was operated at a pressure of 0.4 barg and a temperature of 40° C. The temperature was controlled by circulation of cold water in the cooling jacket of the stripper, the pressure was controlled by venting of the stripper gas phase and a hexane feed rate of 60 L/Hr was used. In the stripper, substantially no polymerization takes place and undissolved hydrogen was removed from the liquid. The liquid volume of 110 liter of the stripper was controlled by transferring the contents of the stripper to a second CSTR configured sequentially with the first CSTR.

The second reactor was controlled at a temperature of 70° C. by circulation of cold water in the cooling jacket of the reactor. Ethylene was fed to the second reactor to control the split and butene as comonomer was fed to the second reactor to control the density of the product. The same catalyst system as was fed to the first reactor was also separately fed to the second reactor. The melt index of the product produced in the second reactor was controlled by controlling the hydrogen concentration in the reactor by continuous venting of the gas phase of the reactor. The liquid volume of 180 liter was controlled by discontinuously transferring slurry from the second reactor to a fluidized bed drier, where powder product was separated from the liquid and unreacted monomers. The powder product was further dried using a rotary drier to obtain a dry powder product. The run conditions are listed in Table 12.

The dual reactor powder samples were dry blended with 2400 ppm Irganox B215 and 750 ppm calcium stearate and then melt-compounded on a Leistritz compounding extruder operated at a temperature profile of 190 to 220° C. at 30 kg/hr and 40 rpm (minimal specific energy). A nitrogen purge was used to reduce the oxygen content as much as possible and the product was melt-compounded three times before the product evaluation. Inventive Example 8 was manufactured as described for Inventive Example 7, except there was no catalyst feed to the second reactor.

In this evaluation, melt index and melt index ratios were determined according to ASTM D-1238; the comonomer content was measured using Fourier Transform Infra Red (FTIR); the molecular weight distributions were measured using high temperature GPC; slow crack growth performance was assessed using PENT lifetime (Pennsylvania Notch Test); critical strain energy release rate, or $G_c$, was determined as described above; and viscosity was measured using a Bohlin Constant Stress Rheometer in the oscillatory mode at 190° C. wherein angular velocities were varied from 0.1 rad/s to 100 rad/s. The viscosity at 100 rad/s is representative for the processability of the resin on fabrication equipment: the lower the viscosity, the easier the processability will be. The viscosity at 0.1 rad/s is proportional to the melt strength of the material. The ratio of these two viscosities also gives an indication of the shear sensitivity of the material. The various properties of Inventive Examples 7 and 8, as compared to comparative run 2, are presented in Table 13.

Table 13 indicates that the toughness, as measured by $G_c$ at different temperatures, of Inventive Example 7 and Inventive Example 8 was outstanding as both were characterized by a very low ductile to brittle transition temperature close to −50° C. Also slow crack growth resistance, as determined by PENT, for both Inventive Example 7 and Inventive Example 8 was excellent as both had PENT lifetimes of greater than 140,000 minutes. Thus, these resins have a unique balance of very low ductile to brittle transition temperature and good resistance to slow crack growth.

To evaluate pipe performance, pipes of 32 mm SDR 11 were manufactured of Inventive Examples 7 and 8 and comparative run 2 on a Weber NE 45 pipe extruder. The extruder had a single 45 mm diameter screw and 30 D length followed by a standard PE layout comprising a Weber type PO 63 annular pipe die, two 6.6 m long cooling baths with vacuum calibration taking place in the first bath, a caterpillar haul-off and a cutting unit. Fabricated pipes were then subjected to hydrostatic testing according to ISO1167. The hoop stress results for the pipes are presented in Tables 14-16.

From these data, regression analysis provided the following power law equation for Inventive Example 7 which for a 50-year lifetime predicts a failure

TABLE 12

Run conditions

|   |   |   | Inventive Example 7 | Inventive Example 8 |
|---|---|---|---|---|
| R1 | Temperature | °C. | 70 | 70 |
|   | Pressure | barg | 5.9 | 1.9 |
|   | Hexane flow rate | L/Hr | 70 | 70 |
|   | Ethylene flow rate | kg/hr | 8.9 | 8.1 |
|   | Hydrogen flow rate | NL/hr | 34 | 26 |
|   | Catalyst flow rate | g/hr | 4.7 | 13.7 |
|   | Production rate | kg/hr | 6.7 | 7.7 |
| R2 | Temperature | °C. | 70 | 70 |
|   | Pressure | barg | 4.7 | 4.0 |
|   | Hexane flow rate | L/hr | 40 | — |
|   | Ethylene flow rate | kg/hr | 10.6 | 9.3 |
|   | Butene flow rate | L/hr | 0.64 | 0.73 |
|   | Catalyst flow rate | g/hr | 4.7 | — |
|   | Vent flow rate | kg/hr | 2.0 | 0.5 |
|   | Production rate | kg/hr | 7.4 | 8.0 |

TABLE 13

Product properties

|   |   | Inventive Example 7 | Inventive Example 8 | comparative run 2 |
|---|---|---|---|---|
| Melt index |   |   |   |   |
| $I_5$ | g/10 min | 0.21 | 0.17 | 0.40 |
| $I_{10}$ | g/10 min | 0.79 | 0.66 |   |
| $I_{21.6}$ | g/10 min | 5.72 | 4.87 | 9.39 |
| Ratio $I_{21.6}/I_5$ | — | 27.24 | 28.65 | 22.70 |
| Density | g/cm$^3$ | 0.951 | 0.9493 | 0.9593 |
| Comonomer | mole % | 0.45 | 0.55 |   |
| GPC Results | $M_w$ | 226400 | 246800 |   |
|   | $M_w/M_n$ | 15.61 | 15.14 |   |
| RCD |   | Yes | Yes | No |
| Rheology |   |   |   |   |
| Viscosity @.1/s | Pa·s | 95622 | 109292 | 60703 |
| Viscosity @100/s | Pa·s | 2758 | 2860 | 2338 |
| Tensile properties |   |   |   |   |
| Yield stress | MPa | 24.25 | 24.09 | 23.08 |
| Tens Young's Modulus | MPa | 1013 | 1002 | 986 |
| Flex Young's Modulus | MPa | 1014 | 921 |   |
| $G_c$ Brittle Ductile |   |   |   |   |
| 40° C. | kJ/m$^2$ | 45.5$^d$ | 48.5$^d$ |   |
| 23° C. | kJ/m$^2$ | 36.6$^d$ | 43.6$^d$ | 11 |
| 0° C. | kJ/m2 | 26.9$^d$ | 29.2$^d$ |   |
| −10° C. | kJ/m$^2$ | 23.3$^d$ | 25.8$^d$ |   |
| −20° C. | kJ/m$^2$ | 22.1$^d$ | 22.7$^d$ |   |
| −30° C. | kJ/m$^2$ | 19$^d$ | 20.5$^d$ |   |
| −50° C. | kJ/m$^2$ | 19.1$^d$ | 20.3$^d$ |   |
| −60° C. | kJ/m$^2$ | 14$^b$ | 14.8$^b$ |   |
| −70° C. | kJ/m$^2$ | 13.2$^b$ | 13.7$^b$ |   |
| Pent [SCG] | minutes | >142338 | >200000 | >10000 |

$^b$indicated brittle failure mode observed

TABLE 14

Hoop stress results for Inventive Example 7

| Temp., °C. | Stress, MPa | Failure time, hours | Failure Mode |
|---|---|---|---|
| 20 | 12.9 | 845.56 | Ductile |
| 20 | 12.95 | 762.27 | Ductile |
| 20 | 13 | 214.93 | Ductile |
| 20 | 13 | 86.6 | Ductile |
| 20 | 13.05 | 672.33 | Ductile |
| 20 | 13.1 | 121.33 | Ductile |
| 20 | 13.2 | 81.71 | Ductile |
| 80 | 6 | 1484.85 | Ductile |
| 80 | 6.3 | 1496.62 | Ductile |

TABLE 15

Hoop stress results of Inventive Example 8

| Temp., °C. | Stress, MPa | Failure time, hours | Failure Mode |
|---|---|---|---|
| 20 | 12.7 | 85.17 | Ductile |
| 20 | 12.7 | 164.02 | Ductile |
| 20 | 12.75 | 235.78 | Ductile |
| 20 | 12.8 | 88.89 | Ductile |
| 20 | 12.8 | 157.98 | Ductile |
| 20 | 12.85 | 67.41 | Ductile |
| 20 | 12.9 | 56.37 | Ductile |
| 20 | 12.95 | 64.07 | Ductile |
| 20 | 13 | 33.21 | Ductile |
| 20 | 13 | 51 | Ductile |
| 80 | 5.5 | 1505.43 | Ductile |
| 80 | 6.3 | 24.09 | Ductile |

TABLE 16

Hoop stress results for comparative run 2

| Temp. °C. | Stress, MPa | Failure time, hours | Failure Mode |
|---|---|---|---|
| 20 | 13.06 | 65 | Ductile |
| 20 | 13.02 | 32 | Ductile |
| 20 | 12.97 | 48 | Ductile |
| 20 | 12.97 | 72 | Ductile |
| 20 | 12.55 | 178 | Ductile |
| 20 | 12.5 | 314 | Ductile |
| 20 | 12.45 | 208 | Ductile |
| 20 | 12.09 | 3120 | Ductile |
| 20 | 12.04 | 3120 | Ductile |
| 20 | 11.98 | 1285 | Ductile |
| 20 | 11.95 | 3762 | Ductile |
| 20 | 11.9 | 3120 | Ductile |
| 20 | 11.74 | 9936 | Ductile | stress above 12.5 MPa at 20° C. and thereby represents performance of the PE125 pressure class: Stress=13.4*time$^{-0.005}$, with stress in MPa and time in hours.

For Inventive Example 7, no brittle failures were exhibited during hoop stress testing at 80° C., 5.8 MPa stress and >4000 hours. For Inventive Example 8, regression analysis predicts for a 50-year lifetime at 11.6 MPa and 20° C. in accordance with the following power law equation, which represents performance of the PE112 pressure class: Stress=13.53*time$^{-0.0118}$ with stress in MPa and time in hrs.

In another evaluation, the effect of providing a narrow MWD for the higher molecular weight, lower density component was investigated. Comparative run 3 was prepared using the single reactor continuously stirred-tank slurry polymerization with a Ziegler-Natta catalyst system. The catalyst was a non-decanted alkoxide (NDA) and the product was produced under process conditions presented in Table 15. The resulting high density product had an $I_2$ melt index of 94 g/10 minutes and a density of 0.9719 g/cm$^3$ and was produced at a total pressure of 12 bars, a hexane feed rate of 1500 g/hr of hexane, an ethylene supply rate of 816 g/hr ethylene and a hydrogen fed rate of 140 Nliters/hr and the reactor was operated at an average residence time of 82 minutes.

Comparative run 4 was prepared with the same catalyst system as comparative run 3 using different process conditions as presented in Table 17. Comparative run 4 was an ethylene/1-butene copolymer and had an $I_{21.6}$ melt index (Condition 190° C., 21.6 kg) of 0.38 g/10 minutes and a density of 0.9306 g/cm$^3$. Comparative run 4 was produced at a total pressure of 12 bars, a hexane feed rate of 2800 g/hr, an ethylene supply rate of 856 g/h, a hydrogen supply rate of 7.2 Nl/h and a butene supply rate of 200 g/hr and the reactor was operated at an average residence time of 48 minutes.

Comparative run 5 was a product sample taken immediately after the first reactor of a two-reactor slurry polymerization system. Comparative run 5 was a high density product, low molecular weight product and had an $I_2$ melt index of 118 g/10 minutes and a density of 0.9720 g/cm$^3$.

Comparative run 6 was produced using a supported constrained geometry catalyst system, designated herein as "CGC", as described above for Inventive Example 1. Comparative run 6 was manufactured in single-reactor slurry polymerization system using a 26 L CSTR (continuous stirred tank reactor) with adequate stirring to keep the particles in suspension. The reactor was jacketed to remove the heat of reaction and a constant flow of 5900 g/h of propane was fed to the reactor and a constant flow of nitrogen was fed into the vapor space of the reactor. The reactor over pressure was controlled by venting the gas and 2500 g/h of ethylene and 4.96 NL/h of hydrogen were injected below the liquid level using a common pipe. The CGC catalyst was injected, along with liquid propane diluent, below the liquid level. The CGC catalyst concentration in the catalyst vessel was 0.8 wt. % in hexane and solids were withdrawn intermittently. For the manufacture, the reactor temperature was held at 70° C. and pressure was held at 55 barg. The reactor was operated at an average residence time of 60 minutes and the resulting polymer production rate was 714 g/h while the catalyst efficiency was calculated to be 170,813 g PE/g Ti. Details of the process conditions used to manufacture comparative run 6 can be found in Table 14. Comparative run 6 was a high density product and had an $I_2$ melt index of 119 g/10 minutes and a density of 0.9731 g/cm$^3$.

Comparative run 7 was produced using the same catalyst system and polymerization system as comparative run 6, except 163.4 g/h of hexene was fed to the reactor and hydrogen flow was very low and was diluted with nitrogen. The average residence time for the manufacture of comparative run 7 was 60 minutes and the polymer production rate was 441 g/h while catalyst efficiency was calculated to be 150,000 g PE/g Ti. Comparative run 7 was an ethylene/1-hexene copolymer and had an $I_{21.6}$ melt index of 0.25 g/10 minutes and a density of 0.9235 g/cm$^3$.

Product properties for comparative runs 3-7 can be found in Table 18. For abbreviation purposes of this investigation, the broad MWD component was designated as NDA, as it is made using the non-decanted alkoxyide, conventional Ziegler-Natta catalyst system. The narrow MWD component was designated as CGC, as it was made using a constrained geometry catalyst system. The expression "NDA/CGC" then means that the low MW fraction had a broad MWD and the high MW fraction had a narrow MWD. NDA/NDA, CGC/NDA and CGC/CGC are the other designations used in this investigation.

Comparative run 8 was made by dry blending comparative run 3 and comparative run 4 at a ratio of 48:52 (NDA/NDA). This material had a broad MWD LMW and broad MWD HMW. To this mixture, 500 ppm Calcium stearate and 2250 ppm IRGANOX B215 were added. The mixture was then extruded on a small APV twin screw extruder using a melt temperature of 220° C. and a melt pressure of 35 to 50 bar at 200 rpm. The resulting output was approximately 2.6 kg/hr and the specific energy of the extrusion was 0.24 kWh/kg. Also, a nitrogen purge was placed on the extruder feed hopper to avoid or minimized the possibility of oxidative crosslinking.

Inventive example 9 was made by dry blending comparative run 6 and comparative run 4 at a ratio of 48:52. The resulting mixture, CGC/NDA, had a narrow MWD LMW component and a broad MWD HMW component. As a first pass, the mixture was melt-extruded at a low temperature (140° C.) and low throughput (0.4 kg/hr) on a small 60 mm Goettfert single screw extruder. In a second pass, the mixture was melt-compounded on an APV twin screw extruder using the same conditions.

Inventive example 10 was made by dry blending comparative run 5 and comparative run 7 at a ratio of 48:52. This resulting mixture, NDA/CGC, had a broad MWD LMW component and a narrow MWD HMW component. As a first pass, this mixture was melt-extruded at a low temperature (140° C.) and low throughput (0.4 kg/hr) on a small 60 mm Goettfert single screw extruder. In a second pass, the mixture was melt-compounded on an APV twin screw extruder using the same conditions.

Inventive example 11 was made by dry blending powder of comparative run 6 and comparative run 7 a ratio of 48:52. This mixture, CGC/CGC, had a narrow MWD LMW component and narrow MWD HMW component. As a first pass, this mixture was melt-extruded at a low temperature (140° C.) and low throughput (0.4 kg/hr) on a small 60 mm Goettfert single screw extruder. In a second pass, the mixture was melt-compounded on an APV twin screw extruder using the same conditions.

TABLE 17

Process conditions and gas analysis for Single Reactor Products

| Catalyst | | | comp. run 3 NDA | comp. run 4 NDA | comp. run 6 CGC | comp. run 7 CGC |
|---|---|---|---|---|---|---|
| Process Conditions | P | [barg] | 12 | 12 | 55 | 55 |
| | T | deg C. | 88 | 70 | 70 | 70 |
| | $C_6$ flow | [g/h] | 1501 | 2800 | | |
| | Propane flow | [g/h] | | | 5902 | 5902 |
| | Tau | [min] | 82 | 48 | 60 | 60 |
| Gas Analysis | $N_2$ | [V %] | 0.87 | 0.8533 | 77.11 | 78.14 |
| | $H_2$ | [V %] | 69.47 | 4.746 | 0.04 | 0.002 |
| | $C_2$ | [V %] | 19.89 | 82.206 | 10.70 | 11.56 |
| | $C_2H_6$ | [V %] | 1.07 | 0.04052 | | |
| | $C_4$ | [V %] | 0.01 | 5.152 | | |
| | Isopentane | [V %] | 0.01 | 0.7445 | | |
| | $C_6$ | [V %] | 1.44 | 9.452 | 0.07 | 0.03 |
| | $C_3H_6$ | [V %] | 0.22 | 0.2034 | | |
| | $C_3H_8$ | [V %] | 0.01 | 0.009156 | 12.50 | 10.80 |
| | $H_2/C_2$ gas phase ratio | [mol %/mol %] | 3.511 | 0.057733012 | 0.003383 | 0.000173 |
| | $C_4/C_2$ gas phase | [mol %/mol %] | 0.000 | 0.062671824 | | |
| Process Flows | $C_2$ flow start | [g/h] | 68.66 | 230 | 2497.00 | 2497.00 |
| | $H_2$ flow | [Nl/h] | 140.42 | 7.213 | 4.96 | 0.00 |
| | $C_2$ flow | [g/h] | 816.23 | 856.475 | 2497.00 | 2497.00 |
| | $C_4$ flow (AK 3) | [g/h] | 0.00 | 199.941 | | |
| | hexene flow | [g/h] | | | 0.00 | 163.44 |
| | Catalyst flow | [micromolTi/h] | 62.06 | 21.2 | 87.36 | 61.30 |
| | Hexane flow | [g/h] | 207.90 | 71.02 | 5902 (C3), 896 (C6) | 5902 (C3), 628.3 (C6) |
| Product Properties | Powder (before compounding) | Melt Index, $I_2$ g/10 min | 94 | | 100 | |
| | | Melt Index, $I_{21.6}$, g/10 min | | 0.38 | | 0.33 |
| | | Density, g/cm³ | | 0.9306 | | 0.9285 |

TABLE 18

Product Properties

| | | comp. run 3 | comp. run 4 | comp. run 5 | comp. run 6 | comp. run 7 |
|---|---|---|---|---|---|---|
| Catalyst | | NDA | NDA | NDA | CGC | CGC |
| $I_2$ | g/10 min. | 95 | 0.36 | 118 | 119 | 0.25 |
| DSC | | | | | | |
| $T_o$ | ° C. | not avail | not avail | 125.0 | 127.4 | 108.8 |
| $T_m$ | ° C. | not avail | not avail | 132.1 | 135.3 | 124.2 |
| Crystallinity | % | not avail | not avail | 85.1 | 86.81 | 51.49 |
| GPC | | | | | | |
| $M_n$ | | 7370 | 82500 | 3970 | 133700 | 137200 |
| $M_w$ | | 26500 | 389200 | 44400 | 355900 | 345300 |
| $M_n/M_w$ | | 3.6 | 4.72 | 11.18 | 2.66 | 2.52 |
| RCD | | No | No | No | No | Yes |
| Density | g/cm³ | 0.9719 | 0.9298 | 0.9720 | 0.9731 | 0.9235 |

TABLE 19

Product Performance Properties

| | | Comp. run 8 | Inventive Ex 9 | Inventive Ex 10 | Inventive Ex 11 |
|---|---|---|---|---|---|
| Mixture | 48%/52% | NDA/NDA | CGC/NDA | NDA/CGC | CGC/CGC |
| Melt Index | | | | | |
| $I_5$ | g/10 min. | 0.32 | 0.43 | 0.27-0.27 | 0.31 |
| $I_{21.6}$ | g/10 min. | 8.64 | 9.97 | 4.11-4.09 | 5.24 |
| $I_{21.6}/I_5$ | Ratio | 27.00 | 23.19 | 15.22-15.15 | 16.90 |
| Density | g/cm$^3$ | 0.9519 | 0.9528 | 0.9506 | 0.9505 |
| RCD | | No | No | Yes | Yes |
| Bohlin Rheology | | | | | |
| viscosity @ .1/s | Pa · s | 74251 | 60151 | 66489 | 61290 |
| viscosity @ 100/s | Pa · s | 2298 | 2110 | 3006 | 3085 |
| Power law K | | 28047 | 23925 | 32067 | 30370 |
| Power law n | | 0.4817 | 0.5077 | 0.5304 | 0.5439 |
| Tensile properties | | | | | |
| Yield stress | MPa | 25.4 | 25.1 | 24.7 | 24.6 |
| Young's modulus | MPa | 1072 | 1011 | 946 | 960 |
| 3 Point Flex. Young's modulus | MPa | 986 | 910 | 837 | 848 |
| Izod Impact | kJ/m$^2$ | 22.1 | 17.1 | 34.7 | 42.7 |
| Rapid Crack propagation Gc ductile - brittle | | | | | |
| 20 | kJ/m$^2$ | 14.8 | 21.4 | 24.0 | 38.9 |
| 0 | kJ/m$^2$ | 10.9 | | | |
| −5 | kJ/m$^2$ | 9.6 | | | |
| −10 | kJ/m$^2$ | 8.8 | | 10.5 | 20.9 |
| −15 | kJ/m$^2$ | 7.5 | | 8.5 | |
| −20 | kJ/m$^2$ | 6.6 | 11.8 | 7.6 | 19.3 |
| −30 | kJ/m$^2$ | 6.4 | 10.0 | | 17.3 |
| −40 | kJ/m$^2$ | | 7.7 | | 12.9 |
| −50 | kJ/m$^2$ | | 7.3 | | 10.4 |
| −60 | kJ/m$^2$ | | | 6.3 | 10.3 |
| $T_{db}$ | ° C. | −12 | −35 | −17 | −45 |
| Slow Crack Growth PENT | Minutes | 59700 | 16362 | >110000 | >110000 |
| GPC | | | | | |
| $M_n$ | | 11700 | 14100 | 7660 | 19700 |
| $M_w$ | | 198800 | 271600 | 233100 | 218900 |
| $M_w/M_n$ | | 16.99 | 19.26 | 30.43 | 11.11 |
| $M_z$ | | 797100 | 2183000 | 757000 | 732600 |

Product properties (reported in Table 19) were determined in this investigation as disclosed in EP 089 586 and WO 01/005852 and the critical strain energy release rate was determined as described above is used.

Table 19 clearly indicates that in a comparison of comparative run 8 to Inventive Example 9 that changing the LMW component from a broad to a narrow MWD (when the HMW component has a broad MWD) surprisingly increases the $G_c$ from 14.8 to 24.1 kJ/m$^2$, and that $T_{db}$ decreases from −12° C. to −35° C. Further, a comparison of Inventive Example 10 to Inventive example 11 shows that changing the LMW component from a broad to a narrow MWD (when the HMW component has a narrow MWD), increases $G_c$ from 24 to 38.9 kJ/m$^2$, and that $T_{db}$ decreases from −17° C. to −45° C.

As demonstrated above, embodiments of the invention provide a new polyethylene composition which is useful for making water and gas pipes and various other articles of manufacture. The new composition has one or more of the following advantages. First, the new composition has better durability. In some instances, exceptional durability is achieved by certain compositions. However, the improved durability is not achieved at the expense of toughness. Certain compositions exhibit good toughness and durability. As such, articles made from the new compositions should have longer service lives. Because the new composition comprises at least two components, desired properties of the overall composition may be obtained by adjusting the characteristics of each component, such as MWD, average molecular weight, density, comonomer distribution, etc. Therefore, it is possible to design a desired composition by molecular engineering. Other characteristics and additional advantages are apparent to those skilled in the art.

While the invention has been described with respect to a limited number of embodiments, the specific features of one embodiment should not be attributed to other embodiments of the invention. No single embodiment is representative of all aspects of the inventions. Moreover, variations and modifications therefrom exist. For example, the polyethylene composition may comprise a third component, either ethylene homopolymer or copolymer, which makes the composition tri-modal in the overall molecular weight distribution. Similarly, a fourth, fifth, or sixth component may also be added to adjust the physical properties of the composition. Various additives may also be used to further enhance one or more properties. In other embodiments, the composition consists essentially of the LMW component and the HMW component described herein. In some embodiments, the composition is substantially free of any additive not specifically enumerated herein. In certain embodiments, the composition is substantially free of a nucleating agent. Cross-linking by physical or chemical methods may be another way to modify the composition. The appended claims intend to cover all such variations and modifications as falling within the scope of the invention.

We claim:

1. A method of preparing a polyethylene composition comprising a low-molecular-weight (LMW) ethylene homopolymer component and a high-molecular-weight (HMW) ethylene interpolymer component, said method comprising:

polymerizing the low-molecular weight ethylene component in one reactor, and polymerizing the high-molecular weight ethylene component in a different reactor, and wherein the two reactors are operated in series or operated in parallel, and wherein the LMW component has a molecular weight distribution, $MWD^L$, of less than about 8, and wherein the HMW component has the following properties: a molecular weight distribution, $MWD^H$, less than about 5, and a substantially uniform comonomer distribution; or wherein the HMW component has a reverse comonomer distribution.

2. The method of claim 1, wherein the low-molecular weight ethylene component and the high-molecular weight ethylene component are each polymerized using a slurry polymerization process.

3. The method of claim 2, wherein each slurry polymerization process takes place in a slurry loop or slurry autoclave.

4. The method of claim 1, wherein the polymerization processes are operated sequentially.

5. The method of claim 1, wherein a catalyst is injected into each reactor.

6. The method of claim 1, wherein a catalyst is injected into a first reactor, and no catalyst is injected into a second reactor, such that polymerization in the second reactor is accomplished from carry-over catalyst, or live polymer, from the first reactor, or combinations thereof.

7. The method of claim 1, wherein the same catalyst is injected into each reactor.

8. The method of claim 7, wherein the catalyst is a single site catalyst.

9. The method of claim 1, wherein the low-molecular weight ethylene component and the high-molecular weight ethylene component are each polymerized using a gas phase polymerization process.

10. The method of claim 9, wherein the polymerization processes are operated sequentially.

11. A method of preparing a polyethylene composition comprising a low-molecular-weight (LMW) ethylene homopolymer component and a high-molecular-weight (HMW) ethylene interpolymer component, said method comprising:

dry blending the low molecular weight component and the high molecular weight component, and wherein the LMW component has a molecular weight distribution, $MWD^L$, of less than about 8, and wherein the HMW component has the following properties: a molecular weight distribution, $MWD^H$, less than about 5, and a substantially uniform comonomer distribution; or wherein the HMW component has a reverse comonomer distribution.

12. The method of claim 1, wherein the LMW component has an $I_2$ value ranging from about 30 to about 2000 g/10 min, as determined in accordance with ASTM D-1238 (2.16 kg/190° C.).

13. The method of claim 1, wherein the HMW component has an $I_{21.6}$ value ranging from about 0.1 to about 1 g/10 min, as determined in accordance with ASTM D-1238 (21.6 kg/190° C.).

* * * * *